(12) United States Patent
Dajnowski

(10) Patent No.: US 11,047,017 B2
(45) Date of Patent: *Jun. 29, 2021

(54) LASER ABLATION DEVICES THAT UTILIZE BEAM PROFILING ASSEMBLIES TO CLEAN AND PROCESS SURFACES

(71) Applicant: G.C. Laser Systems, Inc., Forest Park, IL (US)

(72) Inventor: Bartosz Andrzej Dajnowski, Oak Brook, IL (US)

(73) Assignee: G.C. Laser Systems, Inc., Forest Park, IL (US)

( * ) Notice: Subject to any disclaimer, the term of this patent is extended or adjusted under 35 U.S.C. 154(b) by 528 days.

This patent is subject to a terminal disclaimer.

(21) Appl. No.: 15/953,163

(22) Filed: Apr. 13, 2018

(65) Prior Publication Data

US 2018/0251865 A1     Sep. 6, 2018

Related U.S. Application Data

(63) Continuation-in-part of application No. 15/859,013, filed on Dec. 29, 2017, which is a continuation of
(Continued)

(51) Int. Cl.
*C21D 1/34* (2006.01)
*B23K 26/00* (2014.01)
(Continued)

(52) U.S. Cl.
CPC .............. *C21D 1/34* (2013.01); *B08B 7/0042* (2013.01); *B23K 26/0084* (2013.01);
(Continued)

(58) Field of Classification Search
CPC ............ B23K 26/0807; B23K 26/0084; B23K 26/36; B23K 26/063; B23K 26/352;
(Continued)

(56) References Cited

U.S. PATENT DOCUMENTS 4,358,658 A * 11/1982 Van Blarigan ..... B23K 26/0823
219/121.63
4,986,664 A     1/1991 Lovoi
(Continued)

FOREIGN PATENT DOCUMENTS

AU     2015315390 B2     2/2019
AU     2019200676 A1     2/2019
(Continued)

OTHER PUBLICATIONS

"Office Action," Canadian Patent Application No. 2951718, dated Jun. 18, 2018, 8 pages.
(Continued)

*Primary Examiner* — Phuong T Nguyen
(74) *Attorney, Agent, or Firm* — Carr & Ferrell LLP

(57) ABSTRACT

Laser ablation devices that utilize beam profiling assemblies to clean and process surfaces are described herein. A method includes directing a laser beam in a geometrical pattern at an arcuate surface of a cylindrical target, blocking a portion of the laser beam to prevent a portion of the geometrical pattern from contacting the cylindrical target, and rotating the cylindrical target as the laser beam contacts the arcuate surface so as to ablate the cylindrical target.

20 Claims, 21 Drawing Sheets

Related U.S. Application Data application No. 14/582,987, filed on Dec. 24, 2014, now Pat. No. 9,914,985.

(60) Provisional application No. 62/485,825, filed on Apr. 14, 2017, provisional application No. 62/048,212, filed on Sep. 9, 2014.

(51) Int. Cl.

| | |
|---|---|
| *B23K 26/36* | (2014.01) |
| *B23K 26/352* | (2014.01) |
| *B23K 26/073* | (2006.01) |
| *B23K 26/066* | (2014.01) |
| *B23K 26/082* | (2014.01) |
| *B23K 26/06* | (2014.01) |
| *B08B 7/00* | (2006.01) |
| *B23K 26/361* | (2014.01) |
| *B23K 101/34* | (2006.01) |

(52) U.S. Cl.
CPC ........ *B23K 26/066* (2015.10); *B23K 26/0648* (2013.01); *B23K 26/073* (2013.01); *B23K 26/0734* (2013.01); *B23K 26/082* (2015.10); *B23K 26/352* (2015.10); *B23K 26/355* (2018.08); *B23K 26/36* (2013.01); *B23K 26/361* (2015.10); *B23K 2101/34* (2018.08)

(58) Field of Classification Search
CPC .. B23K 26/361; B23K 26/082; B23K 26/355; B23K 2101/34
USPC ............ 219/121.61, 121.64, 121.78, 121.79; 606/4, 5, 9, 12
See application file for complete search history.

(56) References Cited

U.S. PATENT DOCUMENTS

| | | | |
|---|---|---|---|
| 5,266,787 A | 11/1993 | Mazz et al. | |
| 5,520,679 A | 5/1996 | Lin | |
| 5,582,752 A | 12/1996 | Zair | |
| 5,897,798 A | 4/1999 | Monberg | |
| 5,932,120 A | 8/1999 | Mannava et al. | |
| 6,022,427 A | 2/2000 | Wienand et al. | |
| 6,296,448 B1 | 10/2001 | Suh et al. | |
| 6,541,733 B1 | 4/2003 | Mannava et al. | |
| 9,914,985 B2 | 3/2018 | Dajnowski | |
| 2002/0033384 A1 | 3/2002 | Hirose et al. | |
| 2007/0179479 A1* | 8/2007 | Bille ...................... | A61F 9/008 606/4 |
| 2008/0078751 A1 | 4/2008 | Abrott | |
| 2008/0116182 A1 | 5/2008 | Curry | |
| 2008/0116183 A1 | 5/2008 | Curry | |
| 2009/0039060 A1 | 2/2009 | Palmquist et al. | |
| 2011/0042364 A1 | 2/2011 | Bailey et al. | |
| 2011/0090299 A1 | 4/2011 | Asai et al. | |
| 2011/0240611 A1 | 10/2011 | Sandstrom | |
| 2012/0145685 A1 | 6/2012 | Ream et al. | |
| 2012/0182376 A1* | 7/2012 | Saito ................... | B23K 26/0648 347/248 |
| 2013/0131653 A1 | 5/2013 | Huang | |
| 2013/0140743 A1* | 6/2013 | Simon ................... | B23K 26/359 264/446 |
| 2016/0067824 A1 | 3/2016 | Dajnowski | |
| 2018/0119238 A1 | 5/2018 | Dajnowski | |

FOREIGN PATENT DOCUMENTS

| | | |
|---|---|---|
| AU | 2019200676 B2 | 11/2020 |
| DE | 19500398 C1 | 4/1996 |
| DE | 112015004118 T5 | 6/2017 |
| EP | 1990126 A1 | 11/2008 |
| EP | 2823929 A1 | 1/2015 |
| EP | 3191253 | 7/2017 |
| GB | 2544230 A | 5/2017 |
| WO | WO1992003187 A1 | 3/1992 |
| WO | WO2013133415 A1 | 9/2013 |
| WO | WO2016040288 A1 | 3/2016 |
| WO | WO2016102757A1 A1 | 6/2016 |

OTHER PUBLICATIONS

"Notice of Allowance," Australian Patent Application No. 2015315390, dated Oct. 29, 2018, 3 pages.
"Search Report," Polish Patent Application No. P.422471, dated Oct. 11, 2018, 2 pages (4 pages including translation).
"Office Action," Canadian Patent Application No. 2951718, dated Jan. 30, 2019, 5 pages.
International Search Report and Written Opinion dated Dec. 8, 2015 in PCT application No. PCT/US2015/048892, 9 pages.
"Office Action," Australian Patent Application No. 2015315390, dated Nov. 7, 2017, 3 pages.
"Office Action," Canadian Patent Application No. 2951718, dated Nov. 16, 2017, 6 pages.
Rode, A.V. et al., "Ultrafast Laser Ablation for Restoration of Heritage Objects," Applied Surface Science, vol. 254, No. 10, Mar. 15, 2008, pp. 3137-3146.
"Office Action," Australian Patent Application No. 2015315390, dated Apr. 10, 2018, 4 pages.
"Extended European Search Report," European Patent Application No. 15840697.5, dated Feb. 14, 2018, 7 pages.
Dajnowski, Bartosz Andrzej, "Laser Ablation and Processing Methods and Systems", U.S. Appl. No. 15/859,013, filed Dec. 29, 2017, 45 pages.
"Office Action," Canadian Patent Application No. 2951718, dated Dec. 18, 2019, 8 pages.
"Office Action," Australian Patent Application No. 2019200676, dated Dec. 9, 2019, 3 pages.
"Office Action," United Kingdom Patent Application No. 1703250. 9, dated May 12, 2020, 3 pages.
"Office Action," Canadian Patent Application No. 2951718, dated Jun. 16, 2020, 11 pages.
"Notice of Allowance," Australian Patent Application No. 2019200676, dated Jul. 13, 2020, 3 pages.
"Office Action," Polish Patent Application No. P.422471, dated Jun. 25, 2020, 3 pages (4 pages including translation).
"Office Action", Canada Patent Application No. 2951718, dated Jan. 12, 2021, 7 pages.
"Office Action," Polish Patent Application No. P.422471, dated Jan. 7, 2021, 2 pages.
"Office Action," United Kingdom Patent Application No. 1703250. 9, dated Feb. 1, 2021, 2 pages.

* cited by examiner

LASER ABLATION DEVICES THAT UTILIZE BEAM PROFILING ASSEMBLIES TO CLEAN AND PROCESS SURFACES

CROSS-REFERENCE TO RELATED APPLICATIONS

This application is a continuation-in-part of U.S. patent application Ser. No. 15/859,013, filed on Dec. 29, 2017, entitled "Laser Ablation and Processing Methods and Systems", which is a continuation of and claims the benefit and priority of U.S. patent application Ser. No. 14/582,987, filed on Dec. 24, 2014, entitled "Laser Ablation and Processing Methods and Systems", now U.S. Pat. No. 9,914,985, issued on Mar. 13, 2018, which in turn claims the benefit and priority of U.S. Provisional Application Ser. No. 62/048,212, filed on Sep. 9, 2014, entitled "Methods and Systems for Creating Laser Circles and Ovals for Laser Ablation Cleaning and Material Processing". This application also claims the benefit and priority of U.S. Provisional Application Ser. No. 62/485,825, filed on Apr. 14, 2017, entitled "Laser Devices that Utilize Beam Profiling Assemblies to Clean Cylindrical Surfaces". Each of these applications is hereby incorporated by reference herein in their entireties, including all references and appendices cited therein for all purposes.

TECHNICAL FIELD

The present invention relates to laser ablation cleaning and material processing using a laser. In particular, the present technology provides methods and systems for ablating, cleaning, heat treating, removing contaminants or coatings, or processing a surface, for instance a surface of an artwork or architecture to clean and restore the artwork or architecture, using a laser beam.

BACKGROUND

Buildings, outside sculptures and other things often develop a residue of soot, ash, or other foreign material build-up, including oxidation. Foreign material build-up impairs the appearance of buildings and art, and also promotes deterioration of the surface of the building or sculpture. Consequently, it is beneficial to periodically clean a building or sculpture surface. However, it is important that any cleaning not harm the surface of the building or the artwork. Cylindrical surfaces, such as annilox printing rolls, can build up unwanted contaminants, such as ink, which need to be removed to facilitate proper function of the roll. Therefore, a method and system for cleaning surfaces without damaging the surface material is desired.

SUMMARY

According to example embodiments, the present technology provides systems and methods for directing a laser beam at a surface to form a contact area, and moving the contact area to form a contact curve. In some embodiments, the method can be applied to laser ablate rollers where a roll is rotating in front of a laser scanner. By rotating, the roll moves its surface under the laser scan. An example roll includes an annilox printing rolls. In other embodiments, the laser ablation system can be utilized for cleaning flat surfaces or materials on a conveyor belt that pass under a laser scanner. In some embodiments, the laser scanner can be configured in a handheld embodiment. These laser systems and methods herein can also be used to process or sanitize a surface as well as surface cleaning.

In certain embodiments, the laser beam ablates a coating on the surface at the contact area. The method may include tuning a wavelength and a power of the laser beam to ablate the coating, the coating being one of corrosion, foreign material and oxidation. The wavelength and the power may be further tuned to not ablate the surface.

The operation of moving the contact area may include forming a second contact curve by superimposing, at a same time, the second contact curve on the contact curve. The contact curve may be a contact circle having a diameter, and the second contact curve is a second contact circle having a second diameter. The second diameter may be less than the diameter, and the second diameter may be equal to or greater than one half of the diameter. The operation of moving the contact area further may include forming a third contact curve by superimposing, at the same time, the third contact curve on the second contact curve and the contact curve. The contact curve may be a contact circle having a diameter, the second contact curve may be a second contact circle having a second diameter, and the third contact curve may be a third contact circle having a third diameter. The second and third diameters may be less than the diameter, the second diameter may be equal to or greater than one half of the diameter, and the third diameter may be equal to or greater than one half of the second diameter.

The contact area may be moved by reflecting the laser beam off a mirror rotating around an axis, the axis extending through a plane of the mirror, the axis being at an angle other than 90 degrees, so that the angle of incidence of the laser beam on the mirror varies through a single rotation of the mirror.

The contact area may be moved at a substantially constant rate to avoid hot spots and to provide substantially equal fluence of photons of the laser beam on the surface.

The contact area may be formed by the laser beam impacting the surface at an impact angle, and the impact angle may be less than 90 degrees. The impact angle may be adjustable to provide exposure to irregular parts of the surface when the surface has local areas not parallel to the surface. The contact curve may be a closed curve, and the impact angle may vary as a function of time during a single rotation of the laser beam through the closed curve.

The contact area may be moved in a first circular direction to form the contact curve. The contact area may be moved in a second circular direction superimposed on the first circular direction to form the contact curve. The first circular direction may define a first circle, the second circular direction may define a second circle, and the first circle may have a radius less than or equal to a diameter of the second circle.

According to various example embodiments, a system is provided. The system can comprise a laser and a directing arrangement configured to direct a laser beam from the laser at a surface to form a contact area. The directing arrangement is further configured to move the contact area to form a contact curve.

According to some embodiments, a system for ablating surfaces of cylindrical targets includes (a) a laser sub-assembly that emits a laser beam in a geometrical pattern along a path that extends from a housing of the laser sub-assembly to a target, and (b) a beam profiler that is disposed within the path so as to block a portion of the geometrical pattern of the laser beam from contacting the target.

Another example system comprises (a) a laser sub-assembly that emits a laser beam in a geometrical pattern along a path that extends from an output of the laser sub-assembly to a cylindrical target; and (b) a beam profiler that is disposed within the path so as to block a portion of the geometrical pattern of the laser beam from contacting the cylindrical target, wherein a terminal end of the beam profiler comprises heat sink fins for dissipating heat retained by the beam profiler.

Various embodiments are directed to a method that comprises (a) directing a laser beam in a geometrical pattern at an arcuate surface of a cylindrical target; (b) blocking a portion of the laser beam to prevent a portion of the geometrical pattern from contacting the cylindrical target; and (c) rotating the cylindrical target as the laser beam contacts the arcuate surface so as to ablate the cylindrical target.

According to yet another aspect of embodiments of the present disclosure, a non-transitory processor-readable medium having instructions stored thereon is provided. The instructions, when executed by one or more processors, can cause the one or more processors to implement a method including (a) directing a laser beam in a geometrical pattern at an arcuate surface of a cylindrical target; (b) blocking a portion of the laser beam to prevent a portion of the geometrical pattern from contacting the cylindrical target; and (c) rotating the cylindrical target as the laser beam contacts the arcuate surface so as to ablate the cylindrical target.

DETAILED DESCRIPTION OF EXAMPLE EMBODIMENTS

Figure 1:
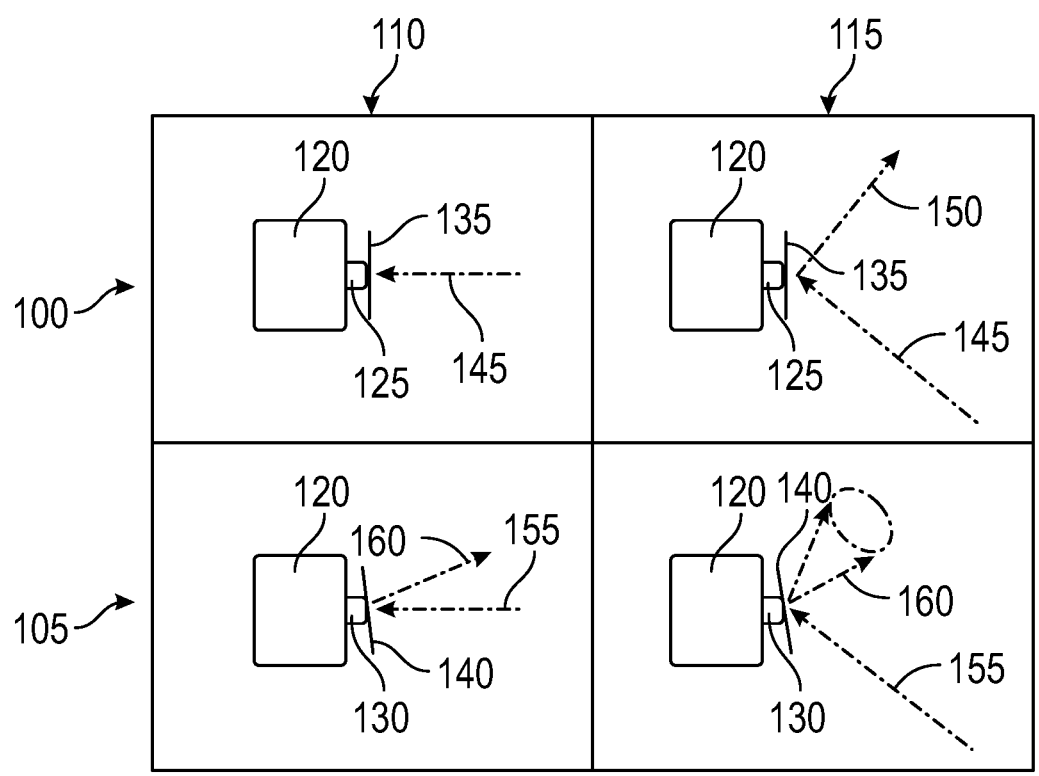
FIG. 1 illustrates offset and perpendicular mirror embodiments of a laser ablation system.

While this technology is susceptible of embodiment in many different forms, there is shown in the drawings and will herein be described in detail several specific embodiments with the understanding that the present disclosure is to be considered as an exemplification of the principles of the technology, and is not intended to limit the technology to the embodiments illustrated.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

The present technology provides a method and system for cleaning a surface using laser ablation. Laser ablation, or other surface processing using a laser, may be achieved by tuning laser parameters such as wavelength, fluence, laser power, pulse frequency, beam profile, spot size, pulse duration or continuous wave or modulated continuous wave operation of a laser. The laser parameters may be tuned to impact a surface coating or contaminant on a surface by ablating, or to process the surface under desired parameters. The laser parameters may be tuned to selectively absorb into a contaminant layer and not damage the underlying substrate, which does not absorb laser light having the same beam parameters. For example, a laser can be set to excite, and consequently vaporize, surface material, while reflecting off the base surface itself without damaging the surface.

The material build-up on the surface of the building, sculpture, or other structure, may be dark or even black. The surface itself may be lighter such as white granite or marble.

The laser may be tuned to be absorbed by the black, or dark, surface, and to not absorb into, and reflect off of, the lighter surface. The laser parameters can be optimized to take advantage of the difference in the light absorption properties of different materials and therefore allow for discrimination between layers of material that are to be removed. Laser ablation and laser processing can result in a variety of desired photomechanical, photothermal, and photochemical effects on a surface. The laser can be used to cause ablation or secondary spallation of a coating or contaminant. The coating or contaminant may be, for example, corrosion and/or oxidation, paint on a surface, soiling, smoke damage, atmospheric pollutants, organic residues, grease, or any other substance that can be applied intentionally or unintentionally to a surface. In addition to cleaning by laser ablation, laser parameters can also be selected for a laser to treat a surface. For example, the laser parameters can be set to prepare, texture, etch, anneal, create oxide layers, heat treat, decontaminate, sterilize, weld, and/or process a surface. This technique can be used to clean and or process organic and inorganic material, for example cleaning stone, cars, paper, textiles, skin, etc., and has been used to clean and remove soiling from the 3,500 year old obelisk in Central Park in New York. It was also used to remove an old coating and corrosion the General Wayne Monument in Fort Wayne Ind. Additionally, this technique has been used to remove rust from historic iron artifacts.

A method according to the present technology may include directing the laser at the surface to form an ablation area (also referred to as a contact area), and moving the ablation area to form an ablation curve (also referred to as a contact curve, contact circle, contact oval, ablation circle, or ablation oval). The ablation area may be moved by any of several methods, including by rotating one or more angled mirrors. Moving the ablation circle may include rotating a flat mirror around an axis intersecting the flat mirror at an angle other than 90 degrees, also referred to as an offset mirror.

The present technology uses circles and ovals for laser ablation cleaning and laser material processing. Using a circle or oval scan, regardless of how it is generated, provides several advantages as compared to a typical line scan moving back and forth. In particular, the methods disclosed herein for using closed curve patterns, for example circles and ovals, avoid hot spots and increase efficiency and rate of cleaning and/or processing. Avoiding hot spots creates a more consistent and even ablation, and facilitates an operator's work by enabling a smooth and consistent pattern of processing.

Methods of creating laser circles for laser ablation and material processing include an offset spinning mirror, a spinning prism, a wedge or prism shaped spinning laser lens such as, but not limited to, an offset prism, rhomboid prism, or Risley prism, and specially programmed galvo scanning heads, or any combination of the previously mentioned methods. Exemplary embodiments of the present technology use one or more offset spinning mirrors to create simple circular/oval and complex scan patterns for high power laser ablation and material processing applications. One spinning offset mirror creates a circle. Increasing the offset angle increases the diameter of the laser circle.

Using a focal lens with a longer focal depth will increase the size of the circle as the beam comes into focus farther along the cone of light. In exemplary embodiments, the beam passes through a lens such as an F-theta lens or a telecentric lens to focus it at a desired focal depth and spot size. Alternatively, no lens may be used.

Systems having two spinning mirrors will generate a circle within a circle, which will cover more surface area. Other exemplary embodiments include systems having one or more spinning mirrors, in which one spinning mirror produces a scan that is one circle outline, and two or more other mirrors scan to fill in the first circle. Since the motion of the mirrors is fluid and continuous, involving no stopping and/or changing direction, there is less wear and tear on the mechanism driving the motion, and resulting in an even distribution of energy.

In exemplary embodiments, a high power pulsed or continuous wave (CW) laser beam is aimed at a mirror. Typically this is done at a 45 degree angle of incidence to the mirror. If the mirror is mounted to a motor, such as a high rotation per minute (RPM) brushless motor, the motor can be made to spin the mirror. FIG. 1 illustrates the use of such a system in exemplary embodiments of the present technology.

In FIG. 1, system 100 is shown in side view 110 and plan view 115. In system 100, motor 120 spins spindle 125, on which is mounted mirror 135. Mirror 135 is mounted such that the plane of mirror 135 is perpendicular to the axis of rotation, as represented by spindle 125. Beam 145 is projected on to mirror 135 in system 100 of FIG. 1. Reflected beam 150 remains stable even if the mirror 135 is spinning in FIG. 1, as shown in plan view 115.

System 105 illustrates the effect of mounting spinning mirror 140 (also referred to as rotating mirror 140) slightly off-axis with respect to the axis of rotation of the motor 120. In system 105, spinning mirror 140, which is also planar, is mounted on spindle 130 of motor 120. In contrast to system 100, in system 105, the plane of spinning mirror 140 is not perpendicular to the axis of rotation, as represented by spindle 130, but is instead mounted at angle, also referred to as an offset. System 105 deflects beam 155 of the laser in a continuously variable manner. As spinning mirror 140 spins, it alternates from being angled up, sideways, down, sideways, etc., causing beam 155 to be deflected in curvilinear beam 160 (also referred to as beam cone 160). Adjusting the angle of spinning mirror 140 and the point of reflection of beam 155 causes changes in the size and shape of curvilinear beam 160. In this manner, curvilinear beam 160 can be tuned to create circles and/or ovals of varying sizes.

In FIG. 1, side view 110 and plan view 115 may be interchanged in the diagrams for system 100 and system 105 without any change in the operation of the system or the explanation thereof.

Figure 2A:
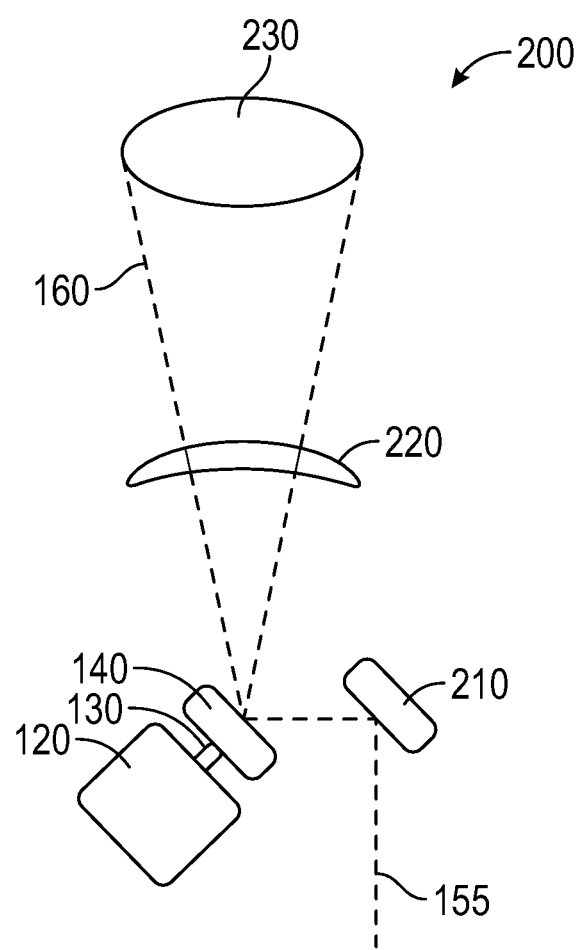
FIGS. 2A-2B are diagrams illustrating example embodiments of a laser ablation system.

FIG. 2A illustrates diagrammatically system 200 including spinning mirror 140 and fixed mirror 210 for directing laser beam 155 through lens 220 into beam cone 160. In an alternative arrangement, fixed mirror 210 may be eliminated and the laser beam may be directed directly at spinning mirror 140. In this manner, the laser itself may be positioned perpendicular to beam cone 160, which may provide a more easily handled device. Still further alternatives provide one or more fixed mirrors to enable the positioning of the laser in any appropriate position while directing laser beam 155 to spinning mirror 140.

In still further alternatives, the positions of spinning mirror 140 and fixed mirror 210 in FIG. 2A may be swapped, so that laser beam 155 hits spinning mirror 140 first, directing beam cone 160 at fixed mirror 210. In this manner, beam cone 160 is lengthened by extending it inside the housing of the laser beam, so that when beam cone 160 exits out the lens it is already a wider cone, creating a larger circle. This allows for larger circular pattern 230 to be created closer to lens 220. Additionally, the offset of spindle 130 of spinning mirror 140 may be reduced to create the same size, or even a larger circular pattern 230. In this manner, the vibration experienced by motor 120 may be reduced, thereby reducing wear of motor 120 and enabling higher RPM speeds for motor 120. Additional mirrors can be used to direct the beam from spinning mirror 140 to the optical lens, or directly to the target if no lens is used.

Beam cone 160 may form circular pattern 230 on a surface when the laser beam of beam cone 160 impacts or contacts a surface. Rotating mirror 140 is mounted on motor 120 by spindle 130. Spindle 130 may rotate at a high rate of speed, for example 30,000, 60,000, 100,000 or more RPM, and may therefore represent an axis of rotation of spinning mirror 140. Spindle 130 may mechanically couple to spinning mirror 140 in any appropriate manner. Spindle 130 may couple to spinning mirror 140 at an angle other than 90 degrees in order to impart an offset angle to spinning mirror 140. The attachment between spindle 130 and spinning mirror 140 may be adjustable so that the offset angle may be selected by an operator. The adjustment of the offset angle may be performed during setup of system 200, or may be adjusted during use by an operator. In this manner, circular pattern 230, or alternatively another closed curve, for example an oval, is created by the laser beam. An operator may then move system 200 to scan circular pattern 230 over a surface to perform ablation or other material processing.

Figure 2B:
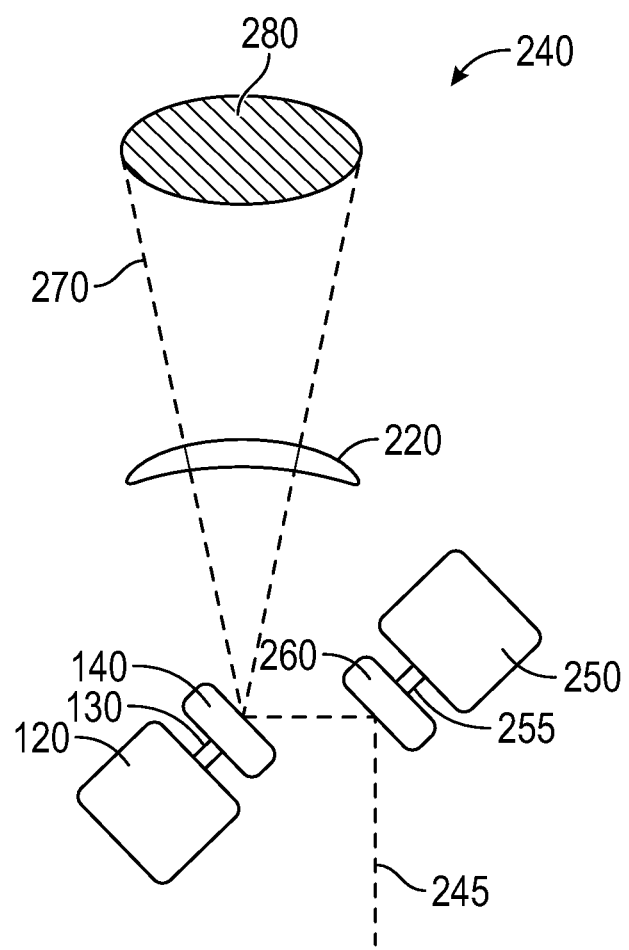
Figure 7A:
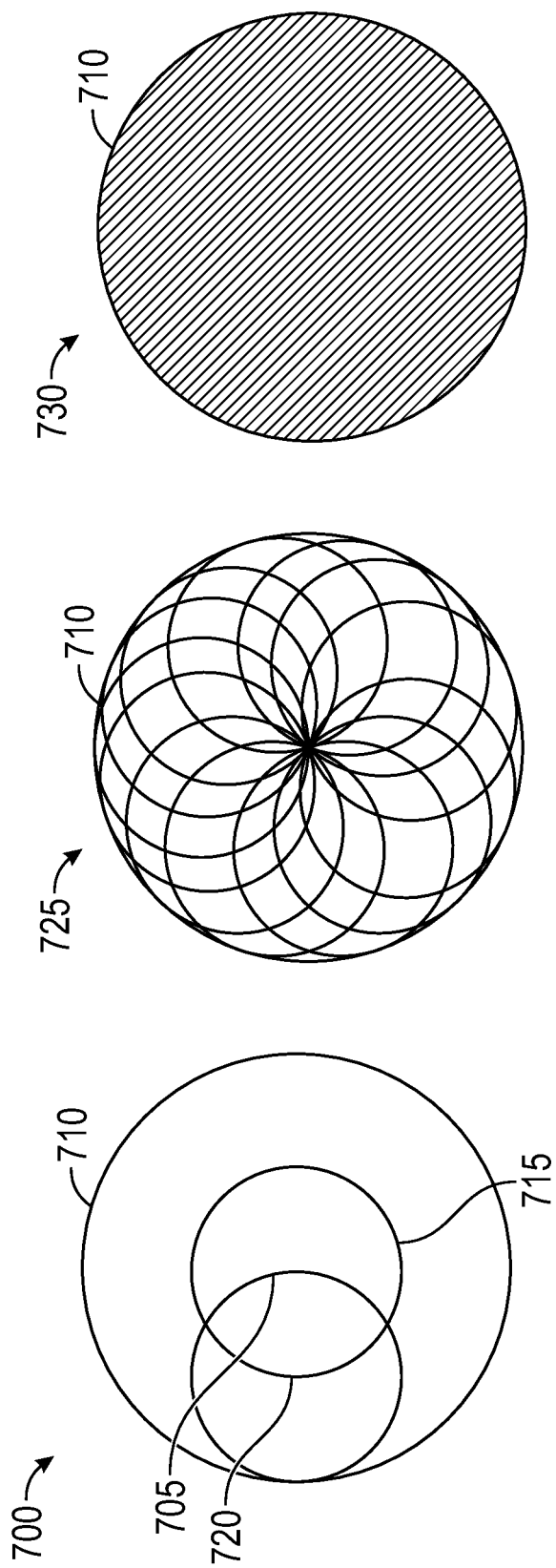
FIGS. 7A-7B are diagrams illustrating example embodiments of a contact area of an exemplary laser ablation system.
Figure 7B:
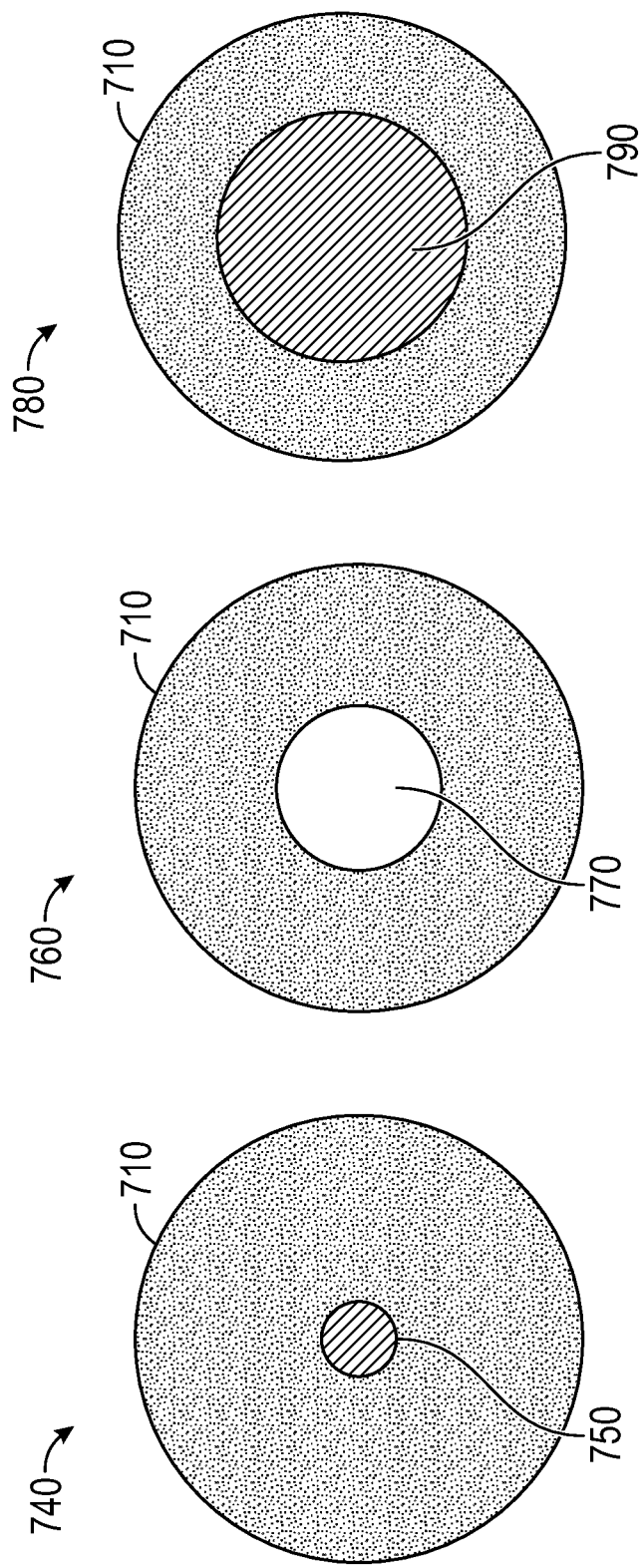

FIG. 2A illustrates the impact of using one offset spinning mirror. Multiple offset spinning mirrors produces laser scan patterns of circles within circles, and provides several additional advantages. Circles with, or superimposed on, other circles (or alternatively ovals or other closed curves) may also be formed using multiple spinning offset mirrors and/or multiple spinning wedge lenses, in the line of a laser beam, as shown in FIG. 2B. By creating circles within circles, full discs of laser ablation coverage are obtained. FIGS. 7A and 7B illustrate this more fully, and are explained hereinafter.

FIG. 2B illustrates diagrammatically a system including two spinning mirrors for directing a laser through a lens in a circular pattern with a second circular pattern superimposed thereon. The two rotating mirrors are mounted on motors (though alternatively, one motor may be used to rotate both mirrors) with offsets in order to change the angle of incidence during a single rotation of each mirror. In this manner, a circle or other closed curve, with a second circle or other closed curve superimposed thereon, is created by the laser beam. The superimposed circles system may have additional advantages for an operator including a larger area of ablation, without hotspots, and with a high degree of control, thereby increasing efficiency and the rate of cleaning and/or processing.

FIG. 2B illustrates diagrammatically system 240 including spinning mirror 140 and second spinning mirror 260 (also referred to as second rotating mirror 260) for directing laser beam 245 through lens 220 into cone 270. Cone 270 may form circular pattern 280 on a surface when the laser beam of cone 270 impacts or contacts a surface. Rotating mirror 140 is mounted on motor 120 by spindle 130. The details relating to rotating mirror 140, including rates of rotation and attachment methods, are the same in system 240 as system 200.

In system 240, second rotating mirror 260 is mounted on motor 250 by spindle 255. Spindle 255 may rotate at a high rate of speed, for example 30,000, 60,000, 100,000 or more rotations per minute (RPM), and may therefore represent an axis of rotation of second spinning mirror 260. Spindle 255 may mechanically couple to second spinning mirror 260 in any appropriate manner. Spindle 255 may couple to second spinning mirror 260 at an angle other than 90 degrees in order to impart an offset angle to second spinning mirror 260. The attachment between spindle 255 and second spinning mirror 260 may be adjustable so that the offset angle may be selected by an operator. The adjustment of the offset angle may be performed during setup of system 240, or may be adjusted during use by an operator. In this manner, circular pattern 280, or alternatively another closed curve, for example an oval, is created by the laser beam. An operator may then move system 240 to scan circular pattern 280 over a surface to perform ablation or other material processing. In still further alternatives, additional reflections and circles (or ovals) may be created to change the circular pattern 280 into a shape that may be more useful or easy to scan by an operator over a surface.

System 240, having two spinning mirrors, creates a more complex pattern than system 100. In particular, the size of the offset angles, the speed of rotation, and the distances between the mirrors, may be adjusted to determine the size of circular pattern 280. In this manner, an internal pattern within the outer perimeter of circular pattern 280 may be created, so that laser ablation occurs over the entire area of circular pattern 280. Additionally, the rate of rotation of spinning mirror 140 and second spinning mirror 260 may be different to ensure the smooth coverage of the internal area of circular pattern 280. In contrast, in system 200 shown in FIG. 2A, laser ablation is provided only on the edge or outline of circular pattern 230. FIGS. 7A and 7B illustrate this more fully, and are explained hereinafter. In this manner, a larger area is ablated and an operator may have increased control over the ablation process.

Figure 3A:
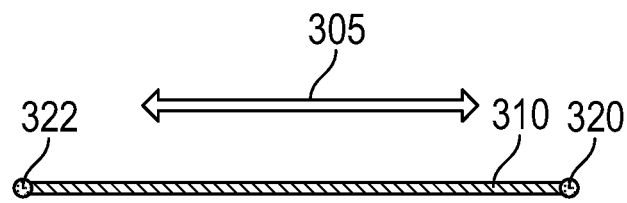
FIGS. 3A-3C illustrate contact area patterns for different laser ablation systems.
Figure 3B:
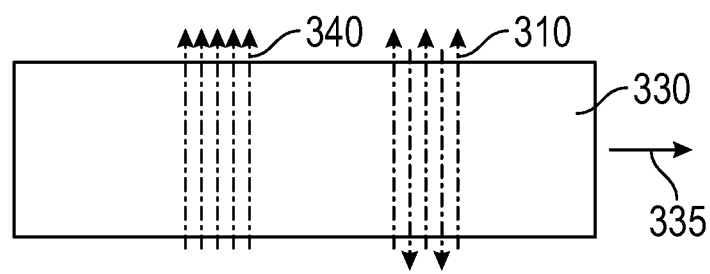
Figure 3C:
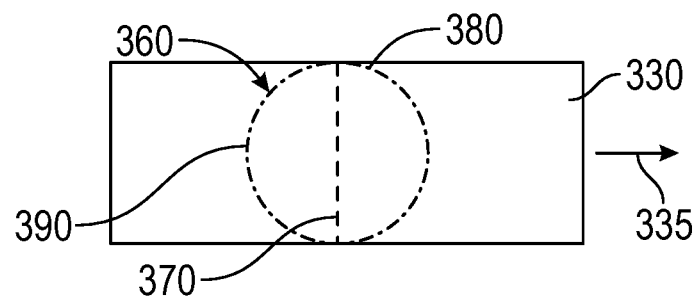

FIGS. 3A-3C each illustrate contact area patterns for different laser ablation systems. FIG. 3A illustrates traditional scan pattern 310 for a back and forth oscillation in the direction of double headed arrow 305 contact area patterns for different laser ablation systems. Since traditional scan pattern 310, such as a galvanometer, stops and starts at both ends of the scan pattern, hot spots 320 and 322 develop at those positions. Reducing the hotspots is achieved only through significant effort that also typically impairs the working of the laser by modulating the pulse strength. Additionally, operation of the mechanism to achieve the back and forth motion typically results in high wear and may cause breakdowns in the system, since there maybe stopping and starting inherent in the operation of the scanning mechanism.

FIG. 3B illustrates two linear scan patterns used on surface 330 moved perpendicular to the line of the scan patterns. In particular, surface 330 is moved in direction 335, though alternatively, surface 330 may be stationary and the laser ablation system may move in the opposite direction to create the same effect. One-way scan pattern 340, which scans in a line in one direction, with the completion of one line immediately preceding the beginning of the next line, as may be produced by a polygonal mirror system described herein. One-way scan pattern 340 has the disadvantage that each scan line must partially overlap the previous and subsequent scan lines, to ensure the entire surface is treated, and the speed at which this can occur limits how quickly the surface can be cleaned or processed.

FIG. 3B also illustrates traditional scan pattern 310, which scans in a back and forth pattern, as shown in FIG. 3A. Traditional scan pattern 310 also has the disadvantage that each scan line must partially overlap the previous and subsequent scan lines, to ensure the entire surface is treated, and the speed at which this can occur limits how quickly the surface can be cleaned or processed. Additionally, traditional scan pattern 310 has the disadvantage of end point hot spots, as discussed in regard to FIG. 3A.

FIG. 3C illustrates circular contact area pattern 360 (also referred to as circular contact area 360) for an exemplary laser ablation system according to the present technology. The exemplary laser ablation system is shown in FIG. 3C operating on surface 330, which move in direction 335, though alternatively, surface 330 may be stationary and the exemplary laser ablation system may move in the opposite direction to create the same effect. Circular contact area 360 may have diameter 370 oriented perpendicular to direction 335, and may have leading edge 380 positioned forward of diameter 370 and trailing edge 390 positioned behind diameter 370. In view of the possibility of surface 330 being stationary and the operator moving the laser ablation system, leading edge 380 may be instead by behind diameter 370 and trailing edge 390 may lead diameter 370. FIG. 3C illustrates a significant advantage of the present technology since each position of the surface 330 is exposed to two passes of the laser. As the laser scans across the surface 330, any given point on the surface 330 will first be exposed to leading edge 380 and then will be exposed a second time by trailing edge 390. One physical movement of the laser scanner results in two exposures of the surface to the laser radiation, whereas linear scan methods result in only one exposure of the surface to laser radiation per one physical movement of the laser scanner, and are limited to how quickly they can be moved across a surface, perpendicular to the scan direction, by the frequency of the scanner. A high RPM rate for the exemplary laser ablation system to produce circular contact pattern 360 assists in ensuring that all points on surface 330 are exposed to the laser beam. Additionally, a high RPM rate and/or a large circle or oval lead to a faster scan speed. Faster scan speeds enable the use of high powered lasers not typically used in laser ablation. For example, lasers used in welding, for instance CW lasers, may be used when very high scan speeds are provided. In this manner, the use of such high powered lasers may also enable larger areas to be processed or ablated with a laser in shorter time periods with less effort. In still further alternatives, circular contact area 360 may be an oval or other closed curvilinear shape.

Figure 4:
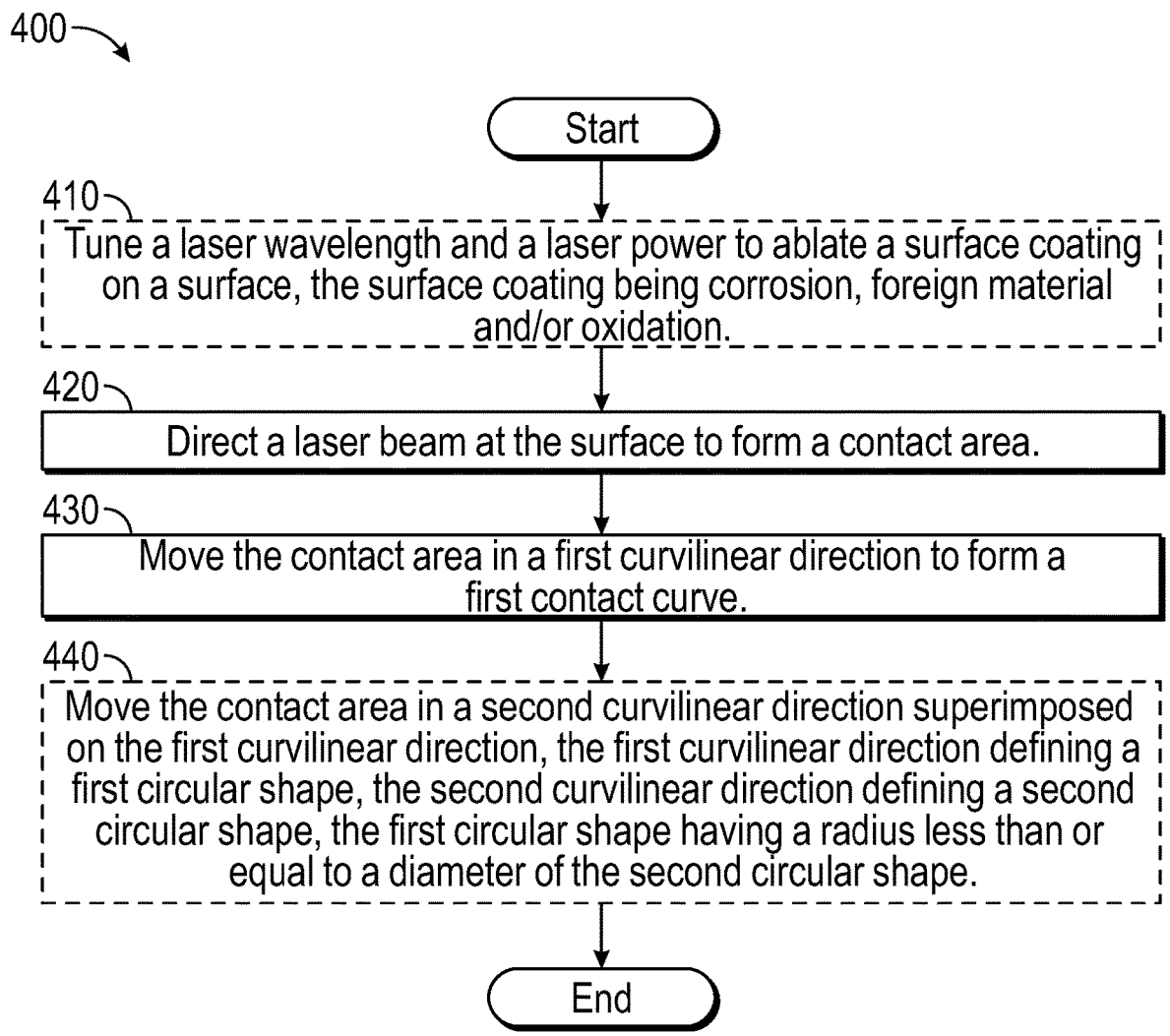
FIG. 4 is a flow chart illustrating an example method according to the present technology.

FIG. 4 is a flow chart illustrating an example method 400 of the present technology. At optional step 410, an operator or computer automated system tunes a wavelength and power of a laser beam of a device according to the present technology. The laser wavelength is tuned to ablate a surface coating on a surface. The power of the laser beam may also be tuned to an appropriate level for the desired purpose. The surface coating is corrosion, foreign material and/or oxidation. From step 410, the method proceeds to step 420.

In step 420 of method 400, an operator or computer-controlled robot directs a laser beam at the surface to form a contact area. The contact area may be a focused or unfocused laser beam. From step 420, the method proceeds to step 430. In step 430 of method 400, the system moves the contact area in a first curvilinear direction to form a first contact curve. The first contact curve may be a circle, oval or other closed curve. From step 430, the method proceeds to optional step 440.

In optional step 440 of method 400, the system moves the contact area in a second curvilinear direction superimposed on the first curvilinear direction. The first curvilinear direction defines a first circular shape, and the second curvilinear direction defines a second circular shape. The first circular shape has a radius less than or equal to a diameter of the second circular shape. For example, the first circular shape may be a first oval or other closed curve, and the second circular shape may be a second circle, oval or other closed curve superimposed on the first circle, oval or other closed curve. Additionally, a third or more circle, oval or other closed curve may be superimposed on the first and second circles, ovals or other closed curves.

Other methods for producing circles include a spinning wedge lens in the path of the beam, and a programmed XY galvo scanner. Other exemplary embodiments utilize a tunable/programmable pulse duration laser cleaning system with a master oscillator power amplifier (MOPA) fiber laser source for laser ablation cleaning. The present technology may be used with lasers having various wavelengths and various pulse durations, particularly high power lasers such as continuous wave, modulated continuous wave, and pulsed lasers such as MOPA lasers, Q-switched, and other pulsed lasers. For example, the present technology can utilize laser wavelengths such as, but not limited to, 2000 nm, 1500 nm, 1064 nm, 532 nm, 355 nm, 266 nm and other wavelengths that can be generated by various laser sources. The present technology may utilize any laser pulse duration such as, but not limited to lasers with pulses that can be measured in femtoseconds, picoseconds, nanoseconds, microseconds, modulated continuous, and continuous wave lasers. The present technology may utilize any appropriate lens, or may be implemented without a lens when using a collimated laser beam of sufficient power for the desired use.

Multiple spinning mirrors may be used for more complex scans, including the concept of creating a scan of a circle within a circle. The laser ablation and material processing methods and systems of the present technology are applicable for: laser ablation cleaning; material processing; decontamination of surfaces; coating removal; surface texturing; paint removal; laser annealing; laser hardening; laser welding; tattoo removal; laser skin treatments; high speed laser scanning, and/or any application where a laser is evenly scanned across a surface.

The spinning prism technique may be used to make circles and other patterns. The number of revolutions per minute of the one or more offset mirrors impacts the rate of movement of the laser beam on the surface (called the impact area or ablation area). In exemplary embodiments of the present technology, 60,000 RPM (or over 100,000 RPM) is achievable using the spinning mirror concept. Likewise, a slowly rotating circle may be desirable, in which case a low RPM spinning mirror may be used.

The laser may be programmed to have specific settings such as energy level, pulse duration, and pulse frequency. The trigger on the hand piece may be manually activated, and control of the RPM of the scan speed may be manually adjusted with a potentiometer or digitally through a control interface. The laser can work with any appropriate lens, including an F-theta lens, a flat field lens, a telecentric lens, a ball lens, etc. The F-theta lens gives a slight angle of impact that is dependent on the geometry of the laser "cone" from the scanner as it makes a circle. The telecentric lens is bigger and ensures there is always a 90 degree angle of impact for the beam.

The laser beam may be controlled by an analog or digital system, for example a control board having dials or buttons that control any appropriate laser parameter, for example laser power, spot size, RPMs, laser pulse frequency, and pulse duration.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, and so forth.

Figure 5:
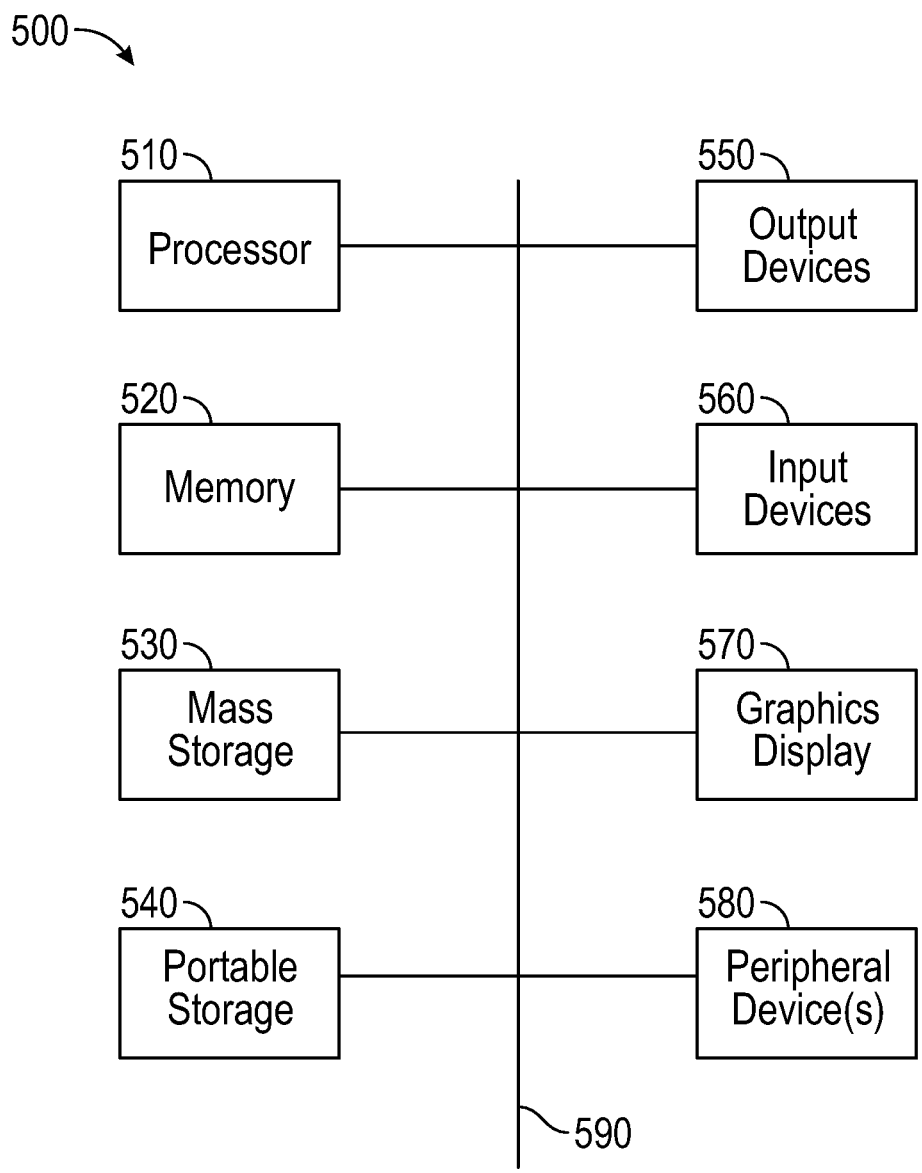
FIG. 5 is a schematic of a computer system according to an example embodiment.

FIG. 5 illustrates an example computing system 500 that may be used to implement an embodiment of the present technology. For example, system 200 and system 240 may be implemented by one or more of the components of computing system 500. Additionally or alternatively, computing system 500 may be used to implement method 400 of FIG. 4. The computing system 500 of FIG. 5 includes one or more processors 510 and memory 520. Memory 520 stores, in part, instructions and data for execution by the one or more processors 510. Memory 520 can store the executable code when the computing system 500 is in operation. The computing system 500 of FIG. 5 may further include a mass storage 530, portable storage 540, output devices 550, input devices 560, a graphics display 570, and other peripheral device(s) 580.

The components shown in FIG. 5 are depicted as being connected via a single bus 590. The components may be connected through one or more data transport means. The one or more processors 510 and memory 520 may be connected via a local microprocessor bus, and the mass storage 530, peripheral device(s) 580, portable storage 540, and graphics display 570 may be connected via one or more input/output (I/O) buses.

Mass storage 530, which may be implemented with a magnetic disk drive or an optical disk drive, is a non-volatile storage device for storing data and instructions for use by one or more processors 510. Mass storage 530 can store the system software for implementing embodiments of the present technology for purposes of loading that software into memory 520.

Portable storage 540 operate in conjunction with a portable non-volatile storage medium, such as a floppy disk, compact disk or digital video disc, to input and output data and code to and from the computing system 500 of FIG. 5. The system software for implementing embodiments of the present technology may be stored on such a portable medium and input to the computing system 500 via the portable storage 540.

Input devices 560 provide a portion of a user interface. Input devices 560 may include an alphanumeric keypad, such as a keyboard, for inputting alphanumeric and other information, or a pointing device, such as a mouse, a trackball, stylus, or cursor direction keys. Additionally, the computing system 500 as shown in FIG. 5 includes output devices 550. Suitable output devices include speakers, printers, network interfaces, and monitors.

Graphics display 570 may include a liquid crystal display (LCD) or other suitable display device. Graphics display 570 receives textual and graphical information, and processes the information for output to the display device.

Peripheral device(s) 580 may include any type of computer support device to add additional functionality to computing system 500. Peripheral device(s) 580 may include a modem or a router.

The components contained in the computing system 500 of FIG. 5 are those typically found in computing systems that may be suitable for use with embodiments of the present technology and are intended to represent a broad category of such computer components that are well known in the art. Thus, the computing system 500 of FIG. 5 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Figure 6:
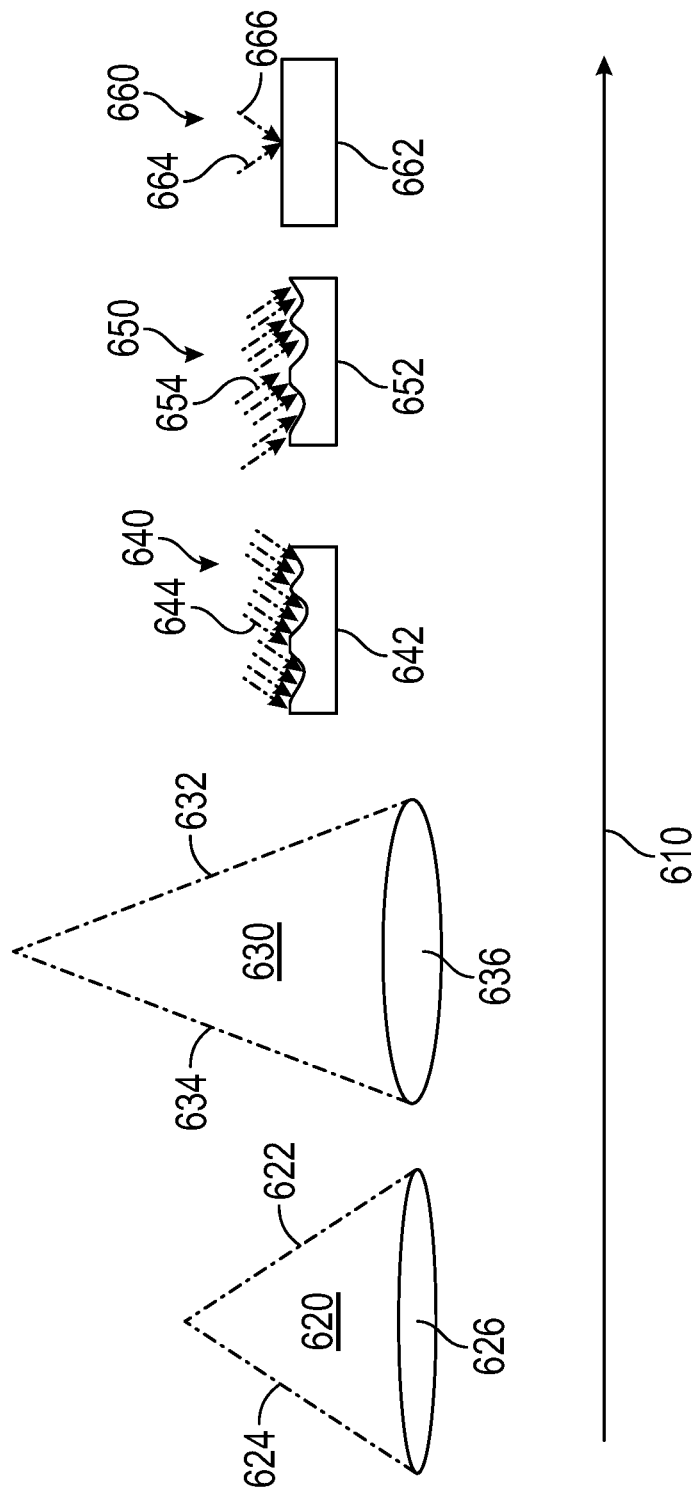
FIG. 6 illustrates impact angles for different laser ablation systems according to the present technology.

FIG. 6 illustrates impact angles for different laser ablation systems according to the present technology. The diagrams in FIG. 6 use direction 610, however all of the explanations are equally appropriate for any other direction. Wide beam cone 620 produces circular pattern 626, which alternatively may be an oval or other closed curvilinear shape. Narrow beam cone 630 produces circular pattern 636, which also alternatively may be an oval or other closed curvilinear shape. Circular pattern 626 may be the same size as circular pattern 636, which makes the distance from a device projecting wide beam cone 620 less than the distance from another device projecting narrow beam cone 630. Alternatively, circular pattern 626 may be larger than circular pattern 636, and the distance from the device projecting wide beam cone 620 may be the same as from the other device projecting narrow beam cone 630. Other variations are also possible for the size of circular pattern 626 and circular pattern 636, and the distance from their respective projecting devices to a surface being treated. The distance from the respective projecting devices to the surface being treated may be adjusted by adjusting the focal length of any lens through which the laser beam is projected.

Wide beam cone 620 may provide improved coverage of highly textured surfaces due to the varying angle of incidence of the laser beam with respect to the plane of the surface being treated. Leading edge 622 of wide beam cone 620 impacts textured surface 652 in diagram 650. Leading edge 622 of wide beam cone 620 includes light rays 654, which may alternatively be considered as photons. Due to the lower angle of incidence on textured surface 652, localized areas on textured surface 652 that are almost perpendicular to the overall plane of textured surface 652 and facing opposite direction 610 receive light rays 654 at an approximately perpendicular angle. Therefore, these areas may are also provided with an even fluence of laser light, and therefore are processed or ablated along with the generally smooth portions of textured surface 652.

Likewise, trailing edge 624 of wide beam cone 620 impacts textured surface 642 in diagram 640. Trailing edge 624 of wide beam cone 620 includes light rays 644, which may alternatively be considered as photons. Due to the lower angle of incidence on textured surface 642, localized areas on textured surface 642 that are almost perpendicular to the overall plane of textured surface 642 and facing in direction 610 receive light rays 644 at an approximately perpendicular angle. Therefore, these areas are also provided with an even fluence of laser light, and therefore are processed or ablated along with the generally smooth portions of textured surface 642. In this manner, wide beam cone 620 may provide improved processing or ablation for highly textured surfaces. As is shown in diagram 660, any point along the surface is exposed to multiple angles of leading edge light ray 664 and trailing edge light ray 666, with one movement of the laser circle.

Narrow beam cone 630, having leading edge 632 and trailing edge 634 may provide sufficient coverage for smooth surfaces, for example surface 662 in diagram 660. Therefore, the angle of incidence of leading edge light ray 664 and trailing edge light ray 666 may be closer to perpendicular to surface 662 without compromising coverage, and with potentially increased efficiency.

FIGS. 7A-7B are diagrams illustrating example embodiments of a contact area of an exemplary laser ablation system. In FIG. 7A, scan pattern 700 illustrates the circle within a circle scan pattern, and in particular the superposition of outer circle 705 and central circle 715. In scan pattern 700, outer circle 705 and central circle 715 are approximately the same size, however in alternative exemplary embodiments, one or the other of outer circle 705 and central circle 715 may be larger than the other. Additionally, in scan pattern 700, central circle 715 is shown as centered, while outer circle 705 is shown off center. However, the opposite positioning may also be considered and is indistinguishable in the superposition. Outer circle 705 and central circle 715 may each represent a circle produced by a rotating mirror.

Superimposing outer circle 705 and central circle 715 causes outer circle 705 to be produced as a circular scan pattern rotating around the outer diameter of central circle 715. In this manner, outer perimeter 710 is formed by the superposition, and has a diameter equal to a diameter of outer circle 705 plus the diameter of central circle 715. In this manner, a larger scan pattern is produced than with a single circular scan pattern. Area 720 illustrates where outer circle 705 and central circle 715 overlap.

As shown in scan pattern 725, continued operation of laser ablation or material processing system having a two-circle superimposed pattern creates a number of circle patterns within outer perimeter 710. Continuing operation of the laser ablation device eventually creates scan pattern 730, in which the entire area within outer perimeter 710 is filled in, representing that all of the area within outer perimeter 710 has been exposed to the laser beam, and had therefore been ablated or processed, as desired.

In FIG. 7B, scan pattern 740 illustrates the circle within a circle scan pattern when the two circles being produced are of approximately the same diameter, but do not have the same diameter. Scan pattern 740 has an outer perimeter 710 having a diameter equal to the sum of the two diameters of the two circles used to produce it. Scan pattern 740 has interior central overlap circle 750, which may be a hot spot due to increased fluence in this area.

Scan pattern 760 in FIG. 7B illustrates the circle within a circle scan pattern when the two circles being produced are of distinctly different diameters, and the rate of rotation for the larger circle is much lower than for the smaller circle. In this situation, inner circular hole 770 forms which is not scanned by the laser beam, and is therefore not ablated.

Scan pattern 780 in FIG. 7B illustrates the circle within a circle scan pattern when the two circles being produced are of distinctly different diameters. In either of these cases, scan pattern 780 is formed including large inner ablation circle 790, which has a higher fluence than the outer ring of scan pattern 780.

As illustrated by FIGS. 7A and 7B, the scan patterns and resulting energy distribution can be manipulated based on the relative diameters of the circles. In general, in a two offset spinning mirror scenario, as long as one mirror is spinning significantly faster than the other mirror, a defined circle or oval will be traced and move within a second circle or oval. Varying relative rotational speeds and rotational direction, such as clockwise versus counterclockwise, of the two or more offset mirrors, for example, can result in more complex and dynamic scan patterns and geometric shapes other than circles, such as stars or triangles. One mirror can be set to spin clockwise and another counterclockwise, or both could rotate clockwise. In exemplary embodiments utilizing rotating offset mirrors to create the circles, the relative speeds are adjusted by determining the rotation rate of the offset mirrors. In this manner, an operator has multiple control parameters for changing the characteristics of the resulting scan pattern when using a circle within a circle pattern, including the diameters of the circles (based on the angle of incidence), and the rate of rotation (determining how fast the two offset mirrors rotate). In further exemplary embodiments, the angle of the offset for one or both (or more) mirrors may be adjusted during installation as needed or controlled by an operator in the field, and therefore the scan pattern may have an additional adjustment. Additionally, the angle of incidence of the laser on the mirror may be adjusted, for example anywhere from parallel to the axis of rotation of the mirror to highly offset from this axis of rotation. Further, by increasing the RPM or the diameter of the circle, the scan speed will increase.

Figure 8A:
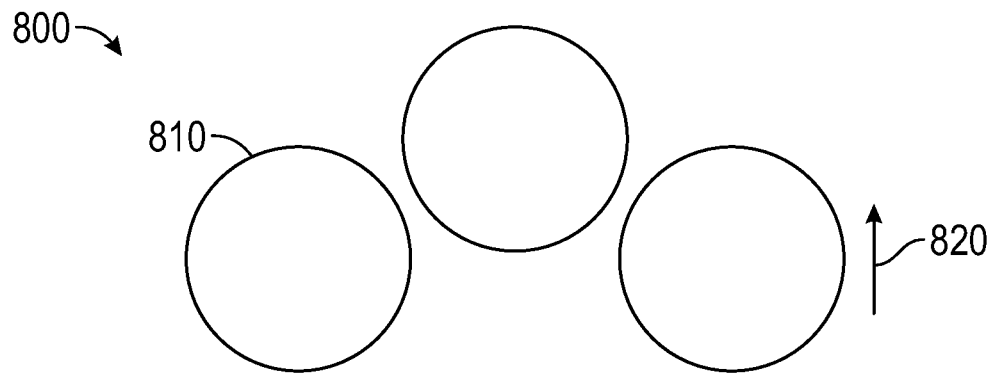
FIGS. 8A-8C are diagrams illustrating example embodiments of contact areas for multiple scanners of an exemplary laser ablation system.
Figure 8B:
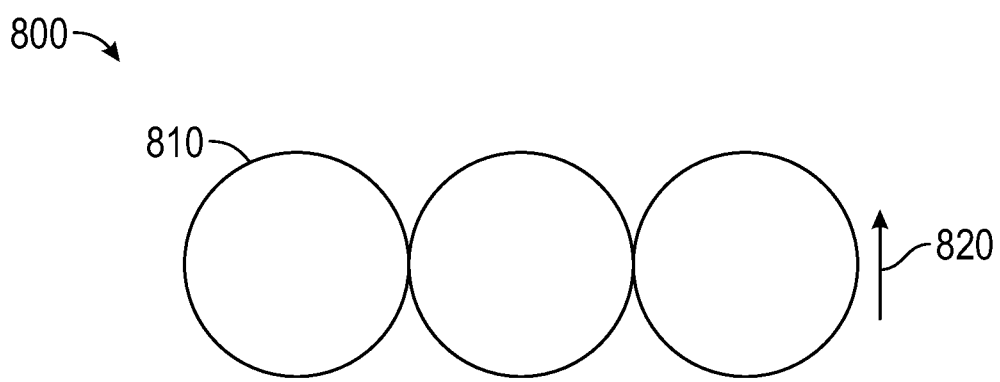
Figure 8C:
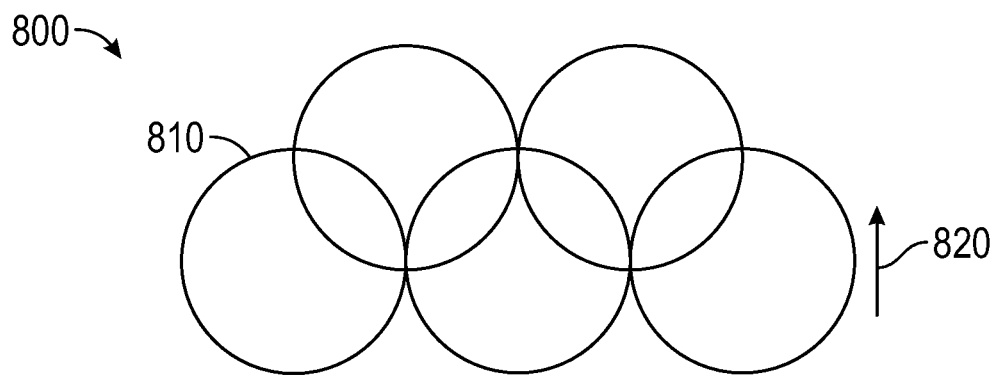

FIGS. 8A-8C are diagrams illustrating example embodiments of contact areas for multiple scanners of an exemplary laser ablation system. Multiple scanners may be used that all share from a single powerful laser source or with their own independent laser sources, with each scanner projecting a circle, oval or other closed curve, with possibly additional circles, ovals or closed curves superimposed. The multiple scanners may be mounted side by side to create a configuration of circles to cover even more area per pass with a scan field of circles. Multiple optic scanners can be mounted together in a larger delivery head to create several circle scans side by side or overlapping each other.

In FIG. 8A, scan pattern 800 illustrates a pattern of three scan circles, which may be moved in scan direction 820. Each scan circle 810 in FIGS. 8A, 8B and 8C may be a single circular scan pattern, or the outer perimeter of a circle within a circle scan pattern. In scan pattern 800, three scan circles are provided that overlap slightly when moved in scan direction 820. In FIG. 8B, scan pattern 830 illustrates a pattern of three scan circles arranged in a line perpendicular to the direction of scan direction 820, and which may be moved in scan direction 820. In FIG. 8C, scan pattern 840 illustrates a pattern of five scan circles arranged in an overlapping pattern, which may be moved in scan direction 820. Additional superimposed circles are also possible, and the scan circles may be of varying and different sizes. Likewise, the scan circles may be ovals, circles, or other closed curves. Furthermore, scan direction 820 may be changed to any other direction, and may be constant or variable. The scanner used to produce the scan patterns may be automated, for example robotically controller, or may be manually controlled. The scan patterns may also vary with time during a single scan or based on user selection.

A perfect circle offers an even energy distribution along the path of the circle. However, depending on how the scanning mechanism is moved across a surface, an oval might be preferred as it changes the way energy is distributed along the curved path, with less energy per unit length on the longer sides of the oval, and higher energy per unit length on the shorter sides of the oval. The more elongated the oval becomes, the lower the energy density of the laser deposition along the elongated axis. There are applications where it is advantageous to use the oval. The laser circle pattern results in two passes over a surface with each movement of the scanner. If one wanted to increase or decrease the amount of time between the first and second pass of the laser, this could be done by stretching or contracting the circle into an oval. In the image below, if the scan pattern was moving at a given speed to the right, then the oval scan pattern would have more of a gap in time before the trailing edge of the sphere hit the same spot the leading edge hit.

According to some embodiments, the present disclosure provides embodiments of a laser system that utilize a laser beam profiler that is selectively placed in a laser path. This laser path extends from where the laser beam exits the laser system (such as a lens and scanner) and a target where the laser beam is directed. Lasers that generate beam patterns comprising a substantially circular laser beam pattern are disclosed in supra with respect to the embodiments of FIGS. 1-8C.

The beam profiler obscures a portion of the substantially circular laser beam pattern, preventing at least a portion of the substantially circular laser beam pattern from contacting the target surface. This effectively results in two arches of the substantially circular laser beam pattern that do not touch, or a broken circle.

These embodiments are advantageous when cleaning curved or round surfaces that are in the shape of tubes or rolls such as but not limited to anilox printing rolls, graveur rolls, texture rolls, and process rolls. These embodiments are also advantageous in cleaning flat and irregular surfaces and or materials that would benefit from two laser exposures, one from the leading arch and a second exposure from the trailing arch. These embodiments utilize the same circle laser scan designs described above that output a conical shaped scan. These embodiments also apply to a circle scan system that produces a tubular circle scan such as a system using a rotating prism and/or a telecentric lens.

Figure 9:
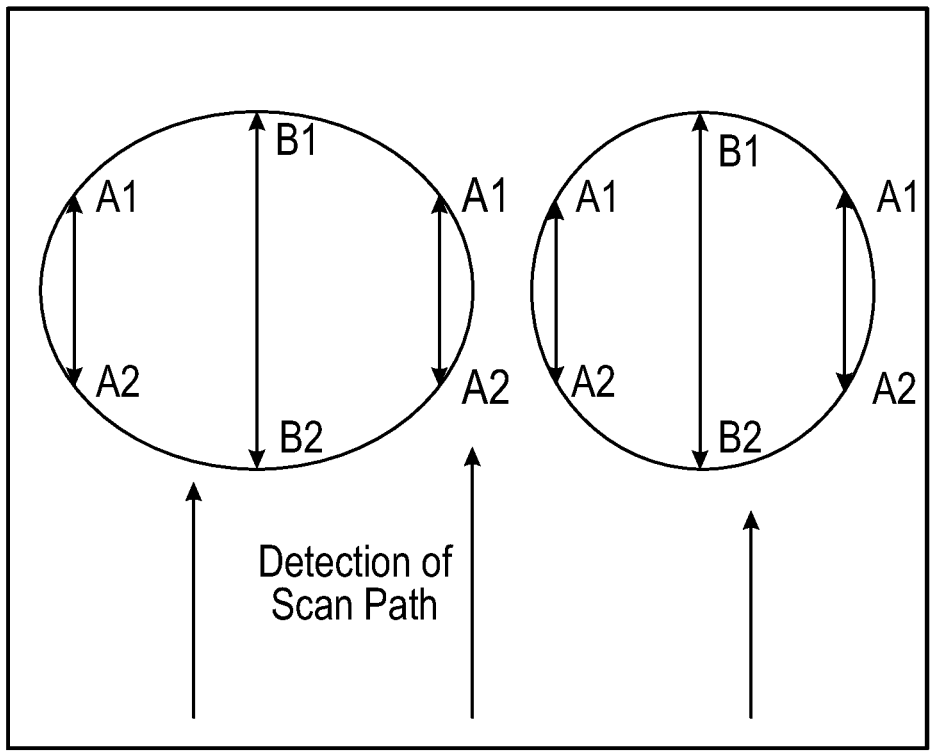
FIG. 9 illustrates example scan patterns in relation to a direction of scan path.

As illustrated in FIG. 9 according to various embodiments of the present technology, as a circular scan moves over a surface, a distance between B1 and B2 in the middle of the scan is greater than the distance between A1 and A2 at the outer edges of the scan. This means that as the scan moves over the surface, or as the material passes under the scanner, there is more time for the surface to cool or stabilize in-between points B1 and B2 and less time for the surface to cool or stabilize between points A1 and A2. There is more exposure to laser pulses at the outer edges of the circular scan in the direction that is parallel to the motion of the scan. This can cause unwanted over exposure of these outer areas and not enough time for material to cool or stabilize. For example, with chrome based roll materials this over exposure can result in thin film oxide formation in these areas as the scan moves over the surface. For example, as the scan moves the area between B1 and B2 does not experience oxide formation, while areas near A1 and A2 do experience oxide formation due to more exposure to laser pulses over a shorter timeframe.

The embodiments described herein provide a solution to this issue by selectively placing a beam splitter/profiler/cropper a distance away from the laser source to divide the circular laser output into sections with a space therebetween. In some embodiments the blocking apparatus is placed in the middle of the circular scan to cut the circle into two halves with a blank area in the middle, allowing these outer areas more time too cool.

Figure 10:
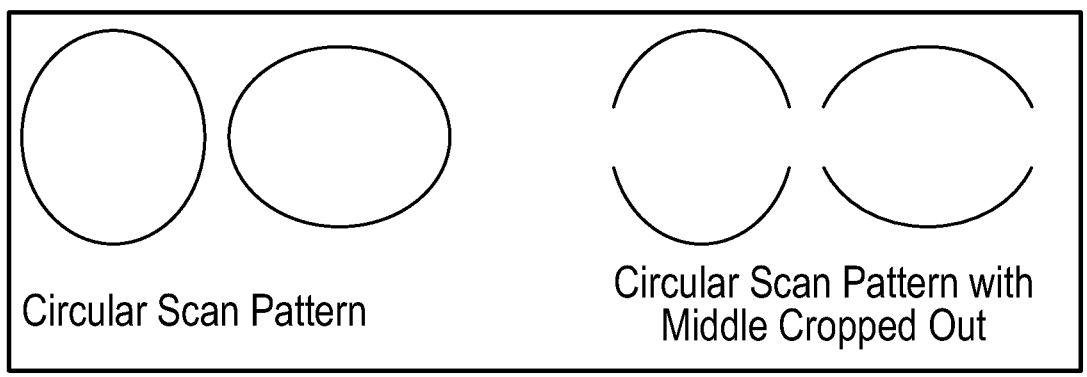
FIG. 10 illustrates circular and substantially circular scan patterns of laser beams, along with cropped versions of these patterns created through the use of a beam profiler.

According to various embodiments, the addition is that a profiler is placed in the path of the cone in order to crop out the center of the circle or oval and create a shape of two arcs or arches. The leading arch and trailing arch can have different angles of incidence, but the mid-section of the laser scan is optically blocked from reaching the surface by placing a beam cropper in the path of the scan to prevent the middle area of laser radiation from reaching the surface. In various embodiments, this beam cropper can be made of aluminum or another metal. FIG. 10 illustrates some example cropped or profiled beam scans in juxtaposition with full beam scans to illustrate blocked portions that comprise gaps between arcs of the beam scans.

Figure 11:
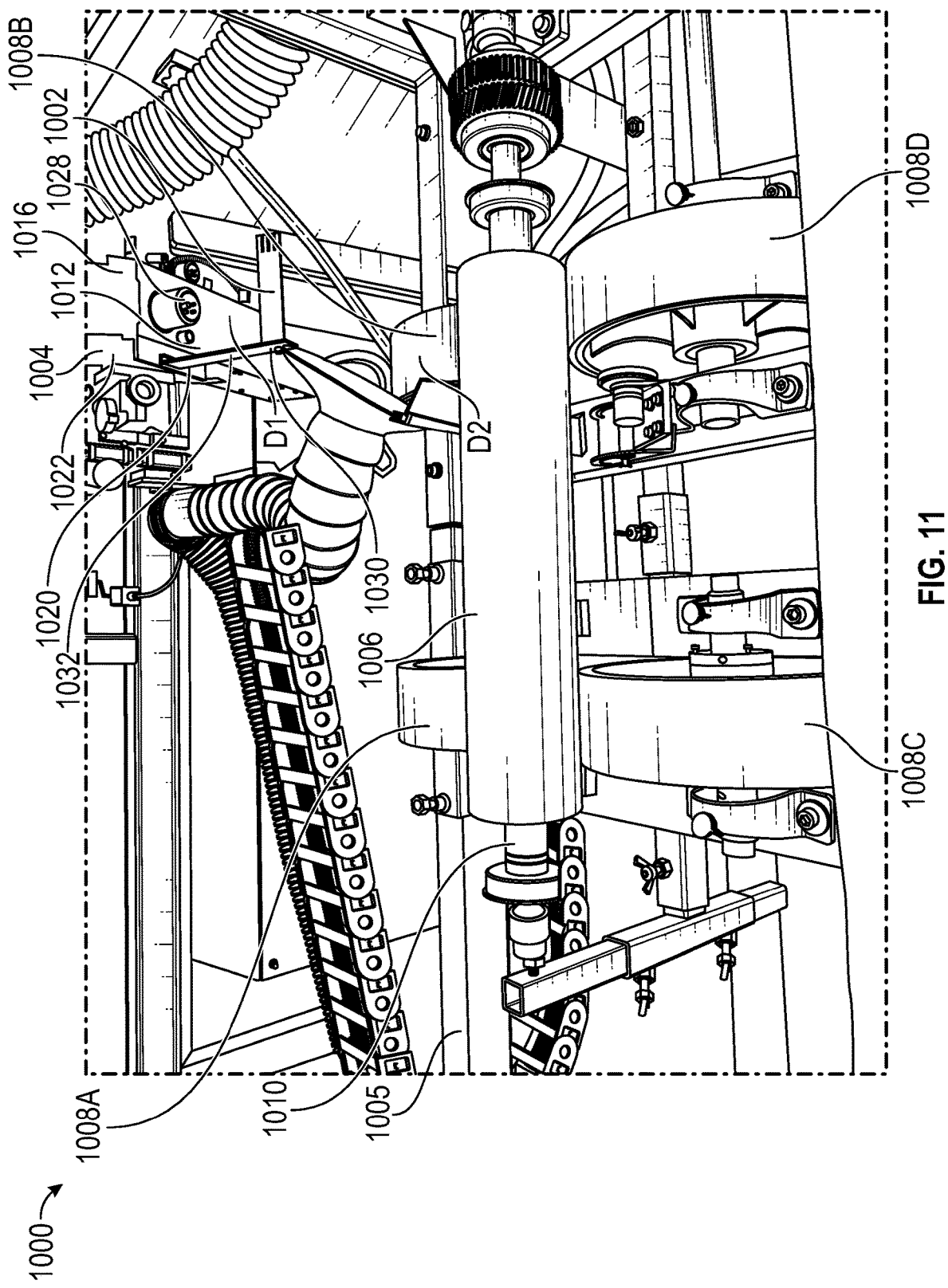
FIG. 11 illustrates an example laser system of the present disclosure that is used to ablate cylindrical targets.

FIG. 11 is an example laser system, according to various embodiments of the present technology. The system 1000 comprises a beam profiler 1002, a laser sub-assembly 1004, and a target 1006.

In some embodiments, the laser sub-assembly 1004 comprises a frame 1005 that supports a plurality of rolling wheels, such as rolling wheels 1008-A-D that rotatingly support the target 1006. A lathe shaft 1010 provides controlled rotating movement of the target 1006 when the target 1006 is coupled thereto. In some embodiments, the target 1006 can be secured on a terminal end by an adjustable armature 1012 that can be adjusted in a vertical direction.

The laser sub-assembly 1004 can comprise a laser source 1016 (inside the housing) that generates laser energy, as well as a scanner (such as a lens, galvo-mirror system, rotating mirrors, rotating prisms) that is used to shape the laser energy into a shaped pattern, such as the pattern illustrated on the target 1006, which comprises an elliptical or ovoid shape (other shapes can also be used) having a portion thereof that is obscured by the beam profiler 1002.

Figure 12:
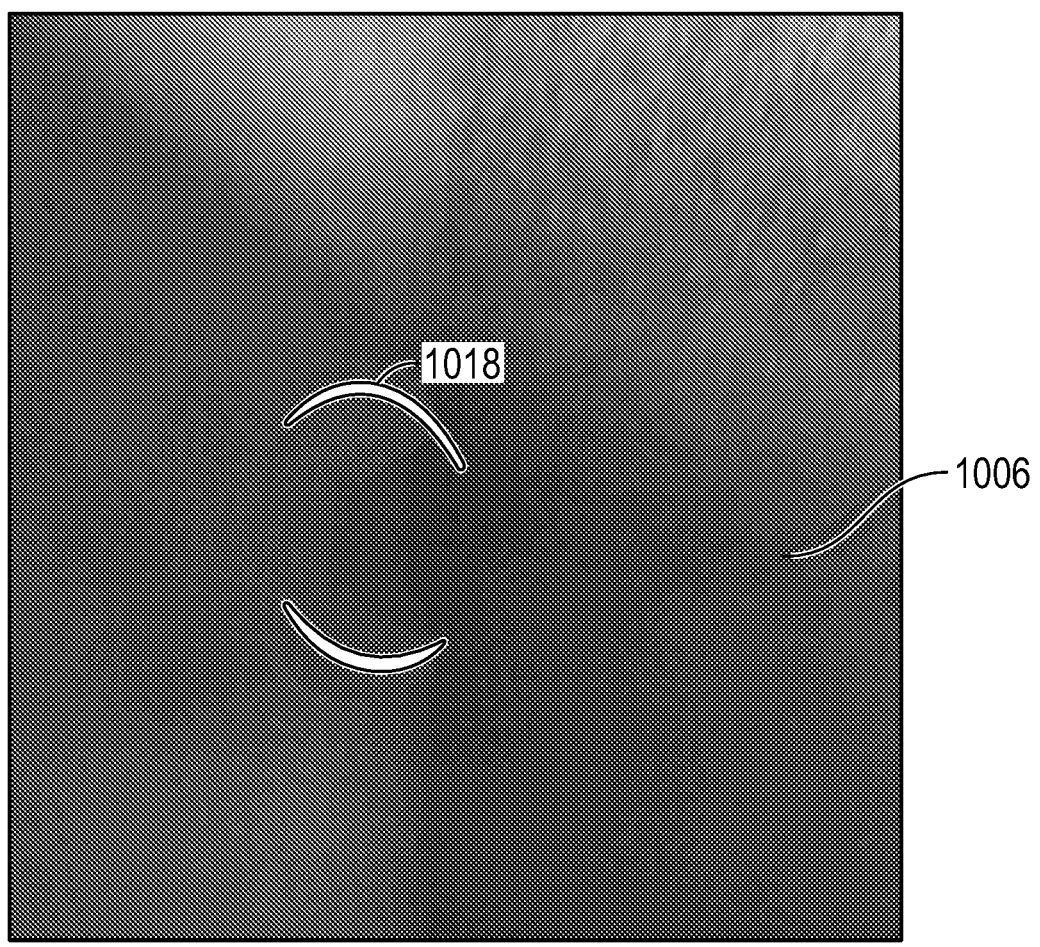
FIG. 12 illustrates a cropped or modified laser beam scan pattern.

The amount of a laser beam 1018 (see FIG. 12) that is cropped in the middle can be varied as needed by changing the position of the beam profiler to crop out more or less of the laser beam 1018 directed at the target 1006. The laser beam 1018 can be cropped in a vertical or horizontal orientation. A close up view of the cropped laser beam is illustrated in FIG. 12.

In some embodiments, the laser sub-assembly 1004 can comprise a laser source that generates laser energy, as well as a scanner that is used to shape the laser energy into a shaped pattern. Example patterns are disclosed and illustrated in FIGS. 10, 13, 18, and 19.

According to some embodiments of the present technology, the beam profiler 1002 can comprise a planar, rectangular section of a chosen material having a given thickness. When placed in a flat orientation within the beam path, the beam profiler 1002 obscures a portion of the laser beam. The beam profiler 1002 can be rotated to set at a tilt angle to obscure more of the laser beam if desired. Also, the distance that the beam profiler 1002 is set away from the laser sub-assembly 1004 is selectively adjustable using an armature that couples to the housing of the laser sub-assembly 1004. In some embodiments, the beam profiler 1002 extends orthogonally to the armature and rotates on the armature to set at the angle.

In more detail, the beam profiler 1002, in some embodiments, comprises a plurality of linkages that position the beam profiler 1002 in the laser path. In one embodiment, the linkages comprise a first linkage 1020 that mounts to a housing 1022 of the laser sub-system 1004. The first linkage 1020 allows the beam profiler 1002 to be set at a distance D1 away from an output 1028 of the laser sub-system 1004. In some embodiments, the beam profiler 1002 is pivotally or rotatably coupled to a terminal end of the first linkage 1024. The beam profiler 1002 is also spaced apart from the target 1006 at a distance D2. The placement of the beam profiler 1002 relative to the output 1028 affects a size of the portion of the laser beam that is obscured by the beam profiler. For example, as the beam profiler 1002 is moved towards the output 1028, the area of the laser beam that is obscured by the beam profiler 1002 increases, whereas distal movement of the beam profiler 1002 away from the output 1028 reduces the area of the laser beam that is obscured by the beam profiler 1002.

The beam profiler 1002 is a substantially flat, rectangular member in this embodiment. In some embodiments, the beam profiler 1002 can have any desired shape and/or size so as to obscure portions of a scan pattern as described herein.

The beam profiler 1002 can traverse relative to the second linkage 1021 by traveling within a slot 1032 of the second linkage 1021. In various embodiments, this movement is produced through cooperation of a fastener 1030 that extends through the slot 1032 fabricated into the beam profiler 1002. The fastener 1030 can be tightened to secure the beam profiler 1002 into a desired configuration. Loosening of the fastener 1030 allows the beam profiler 1002 to slide relative within the slot 1032.

The beam profiler 1002 extends perpendicularly to the terminal end of the second linkage 1021 in one or more embodiments.

As mentioned above, the beam profiler 1002 is pivotally or rotatably coupled to the terminal end of the second linkage 1021. This pivoting connection allows for the beam profiler 1002 to be set at various angles relative to the laser beam.

While the beam profiler 1002 has been illustrated for use in conjunction with the system 1000 that is specifically configured to apply laser energy to a cylindrical or curved target 1006, the disclosures herein related to the use of beam profiler 1002 can be applied to other targets that are not cylindrical. That is, it will be understood that the use of a beam profiler is not limited to instances where a cylindrical target is being laser ablated. As noted above, the laser ablation system 1000 can be utilized for cleaning flat surfaces or materials on a conveyor belt that pass under a laser scanner. In some embodiments, the laser ablation system 1000 can be configured in a handheld embodiment. These laser systems and methods herein can also be used to process or sanitize a surface as well as surface cleaning.

In sum, the beam profiling aspects of the present disclosure can be applied to any of disclosures of U.S. patent application Ser. No. 15/859,013, U.S. patent application Ser. No. 14/582,987, and the disclosures of any applications from which these applications claim priority.

Figure 13:
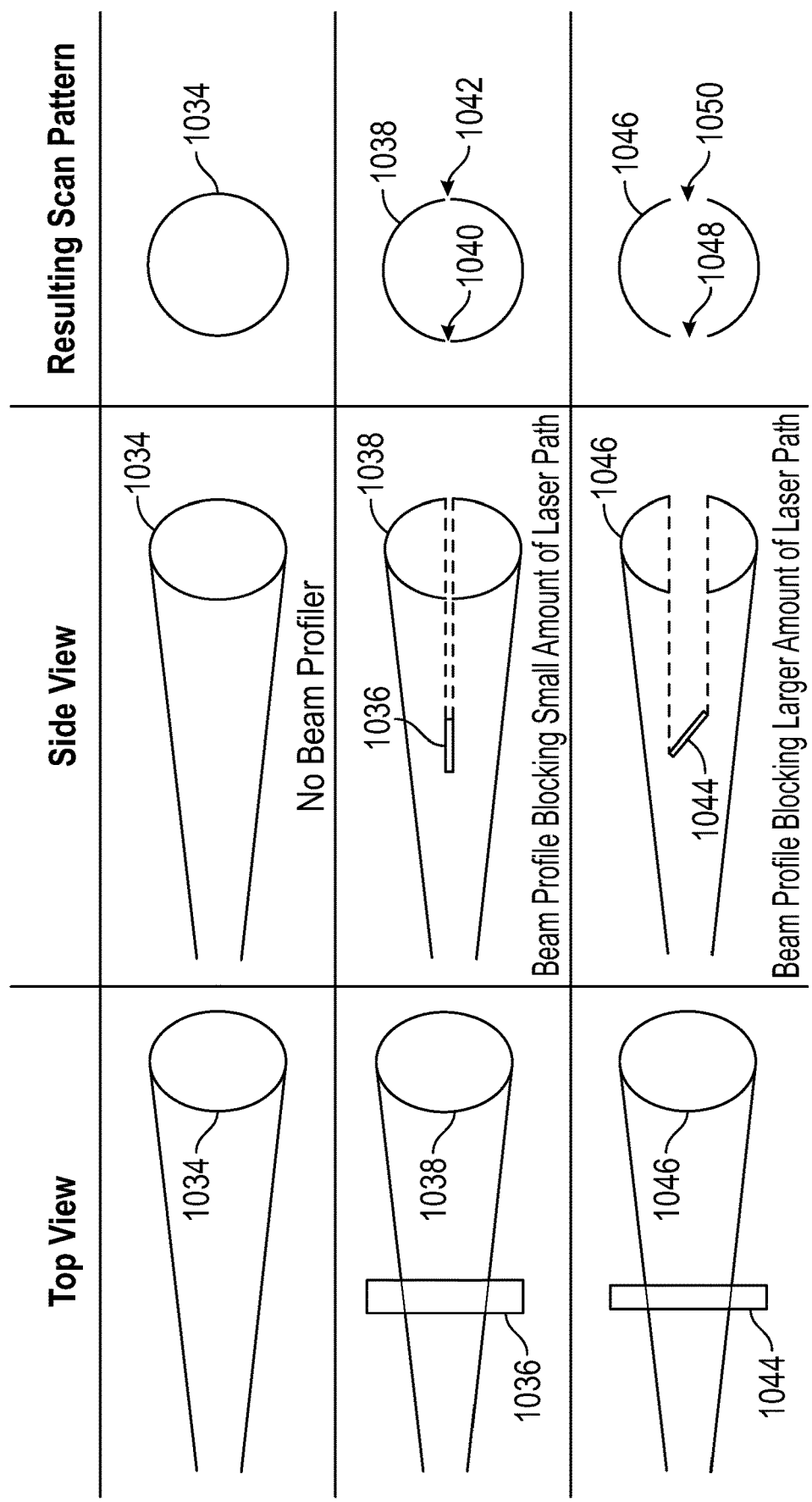
FIG. 13 illustrates various example beam profilers of the present disclosure and corresponding changes in a geometrical pattern of a laser beam.

For example, in FIG. 13, a grid of example device embodiments is illustrated for comparison. In one embodiment, no beam profiler is present in scan pattern 1034. A top view and side view of pattern 1034 are illustrated. A resulting scan pattern of pattern 1034 is also illustrated. In another embodiment, a beam profiler 1036 is utilized to create another example scan pattern 1038. The beam profiler 1036 creates the pattern 1038 with obscured areas 1040 and 1042 on each side of the resulting scan pattern. Both top and side views of the beam profiler 1036 and the pattern 1038 are illustrated.

FIG. 13 also illustrates another example beam profiler 1044 that is utilized to create another example scan pattern 1046. The beam profiler 1044 is tilted to create larger obscured areas 1048 and 1050 on each side of the resulting scan pattern. These obscured areas are larger relative to the obscured areas 1040 and 1042 created by beam profiler 1036. Both top and side views of the beam profiler 1044 and the pattern 1046 are illustrated.

Figure 14:
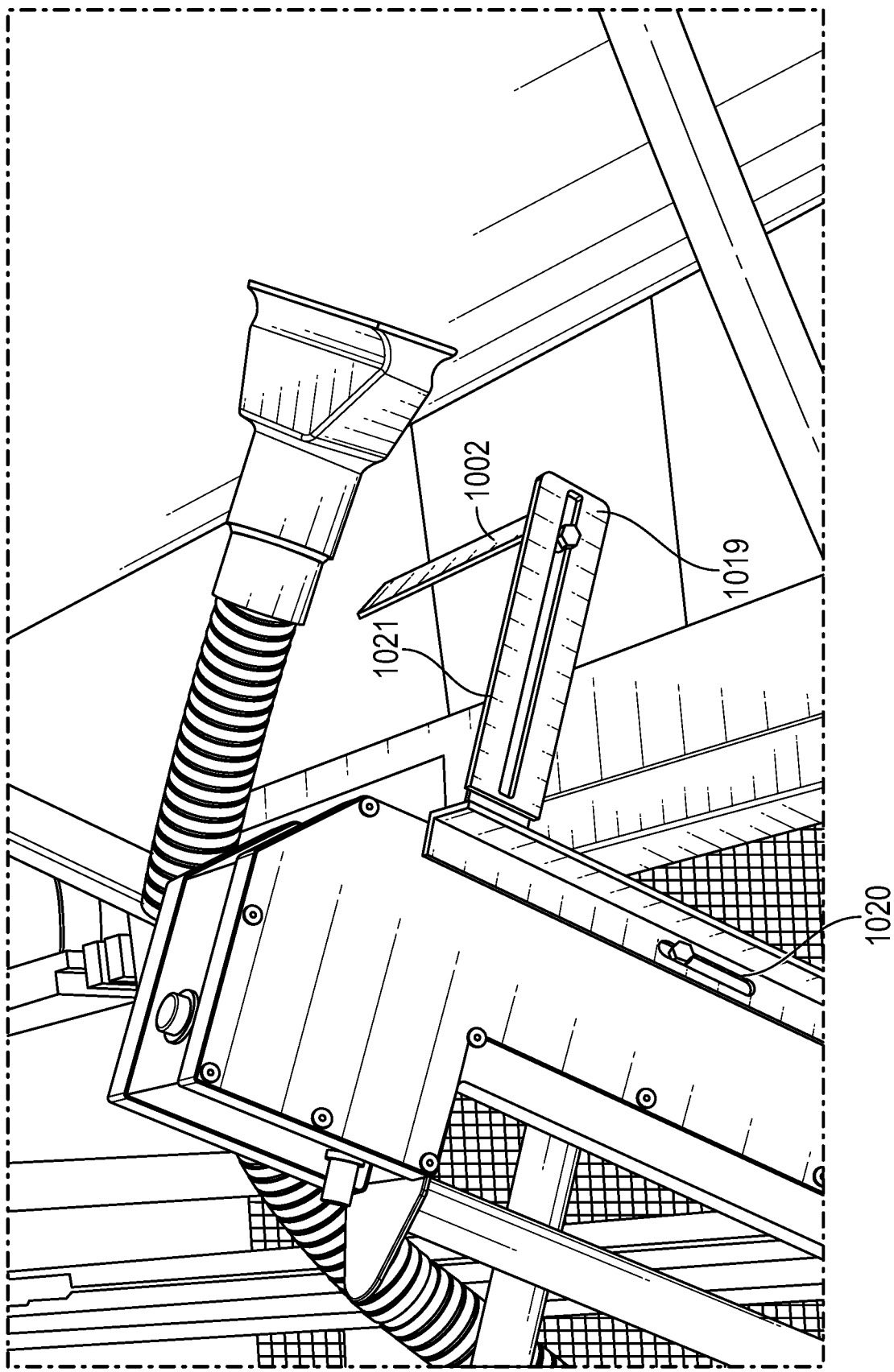
FIG. 14 illustrates a vertically oriented embodiment of a laser system of the present disclosure.

While a linkage system is disclosed for inducing a tilt in the beam profiler 1002, other systems and methods for selectively changing a tilt of the beam profiler 1002 can be utilized in accordance with the present disclosure. For example, the tilt can be effectuated by allowing the beam profiler 1002 to pivot at the terminal end of the second linkage 1021, such as with the embodiment of FIG. 14. In FIG. 14, a vertically oriented laser sub-assembly is incorporated as well as a beam profiler with another embodiment of linkages that allow for selective placement and tilt of the beam profiler.

According to various embodiments of the present technology, a material utilized to create the beam profiler 1002 can comprise any of a metal, an alloy, a ceramic, or other opaque material that is capable of absorbing or blocking laser beam energy emitted by the particular laser sub-assembly 1004 source chosen.

Figure 15:
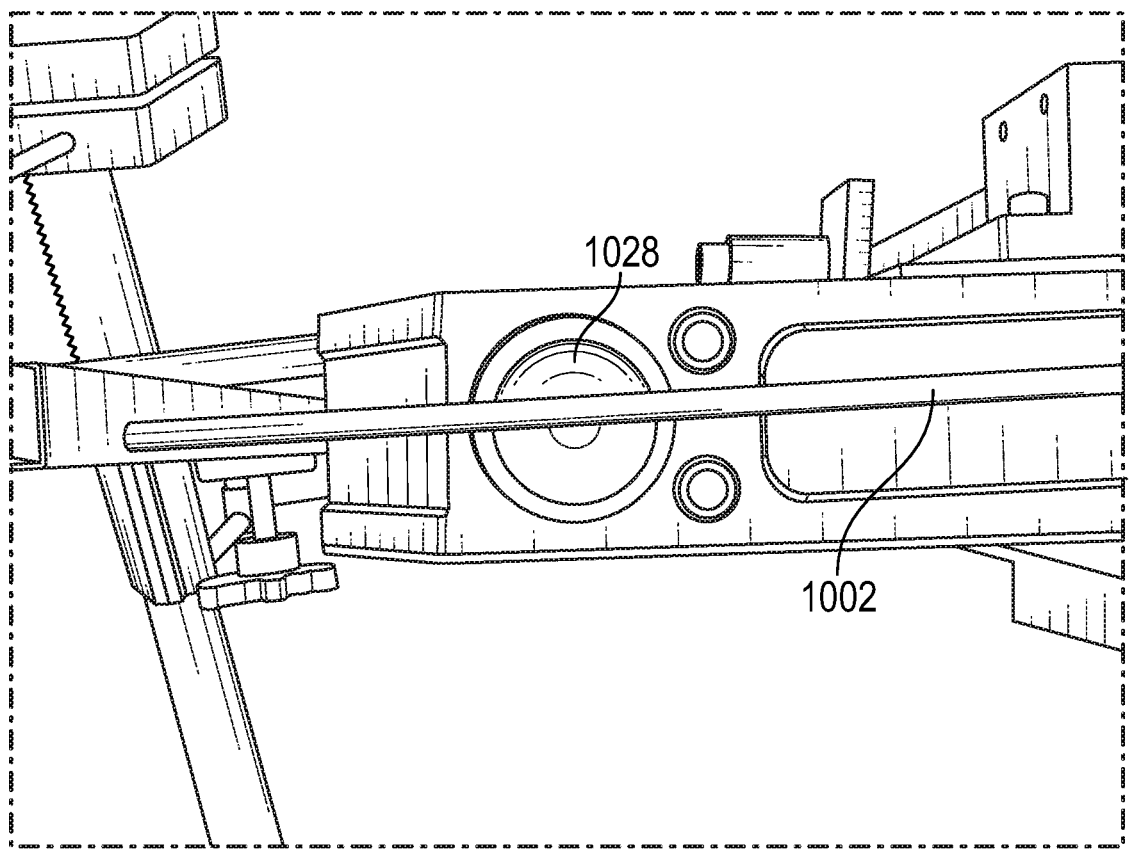
FIG. 15 illustrates an end view of another example embodiment of a laser system of the present disclosure, where the beam profiler is placed in relation to an output of a laser sub-assembly.

FIG. 15 illustrates positioning of the beam profiler 1002 in relation to the output 1028, in one example embodiment.

Figure 16:
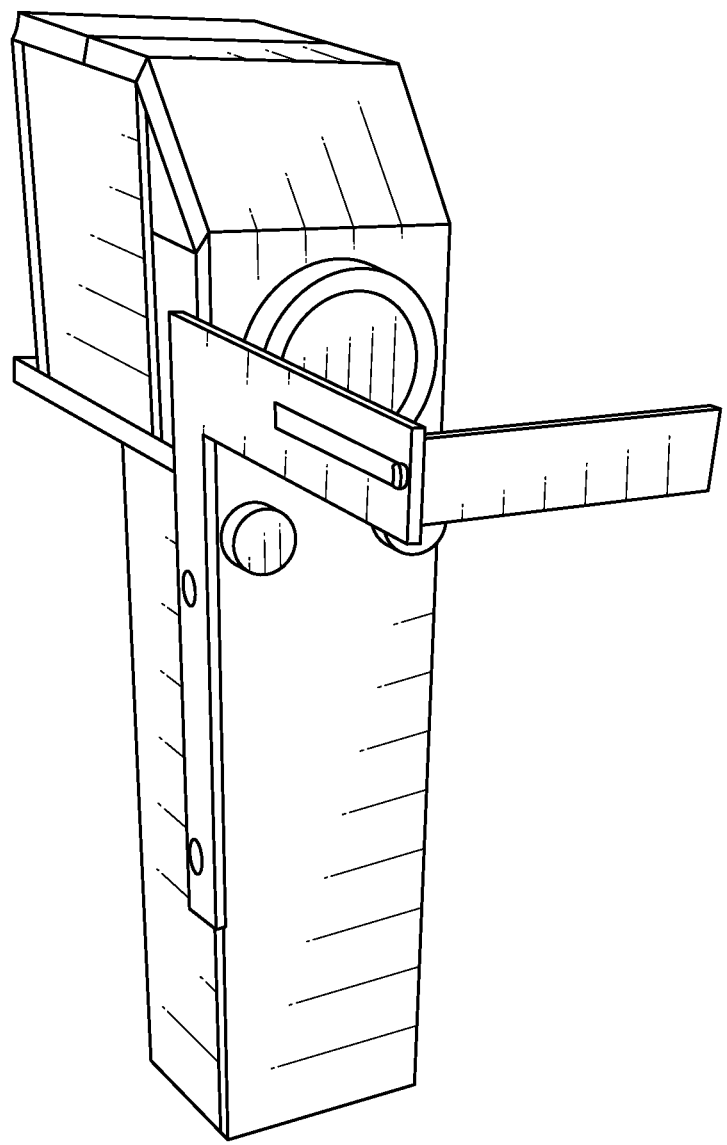
FIG. 16 illustrates another example embodiment of a laser system of the present disclosure.
Figure 17:
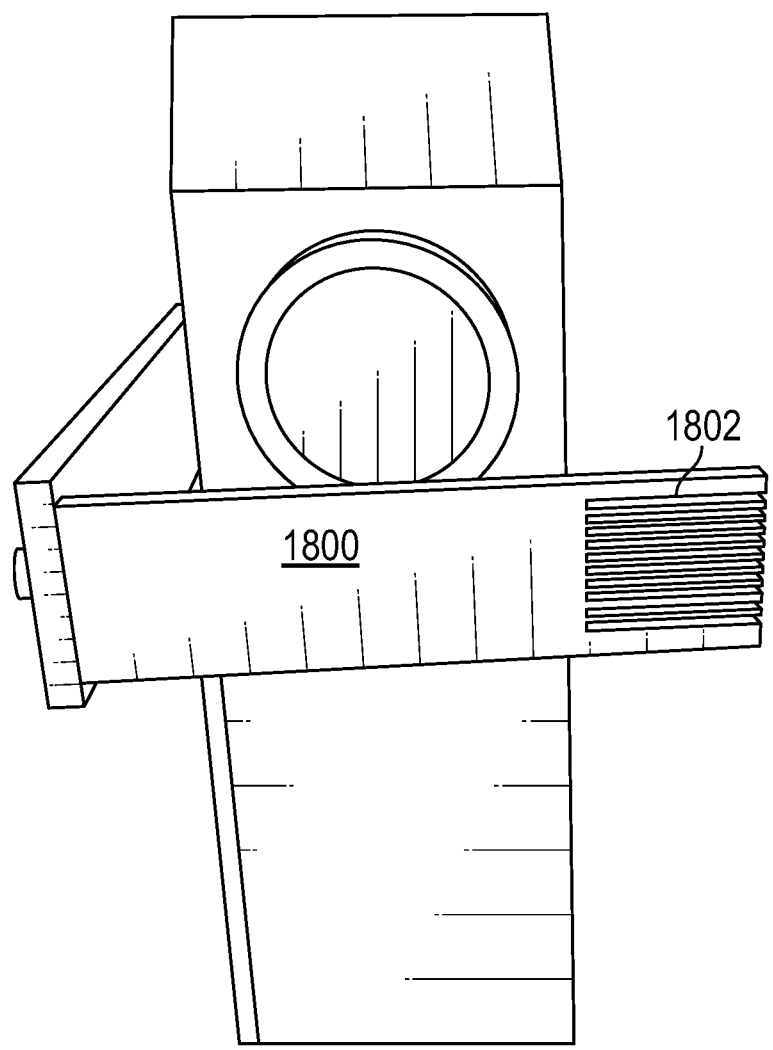
FIG. 17 illustrates another example embodiment of a laser system of the present disclosure having a beam profiler with heat sink fins.

According to various embodiments of the present technology, FIGS. 16 and 17 illustrate additional embodiments of laser systems constructed in accordance with the present disclosure.

In more detail, FIG. 17 illustrates an alternate configuration of a beam profiler 1800 having a feathered ends defining heat sink fins 1802. The heat sink fins 1802 added to the end of the beam profiler 1800 assist with cooling of the beam profiler. That is, the heat sink fins help the beam profiler stay cooler as it absorbs laser energy.

Figure 18:
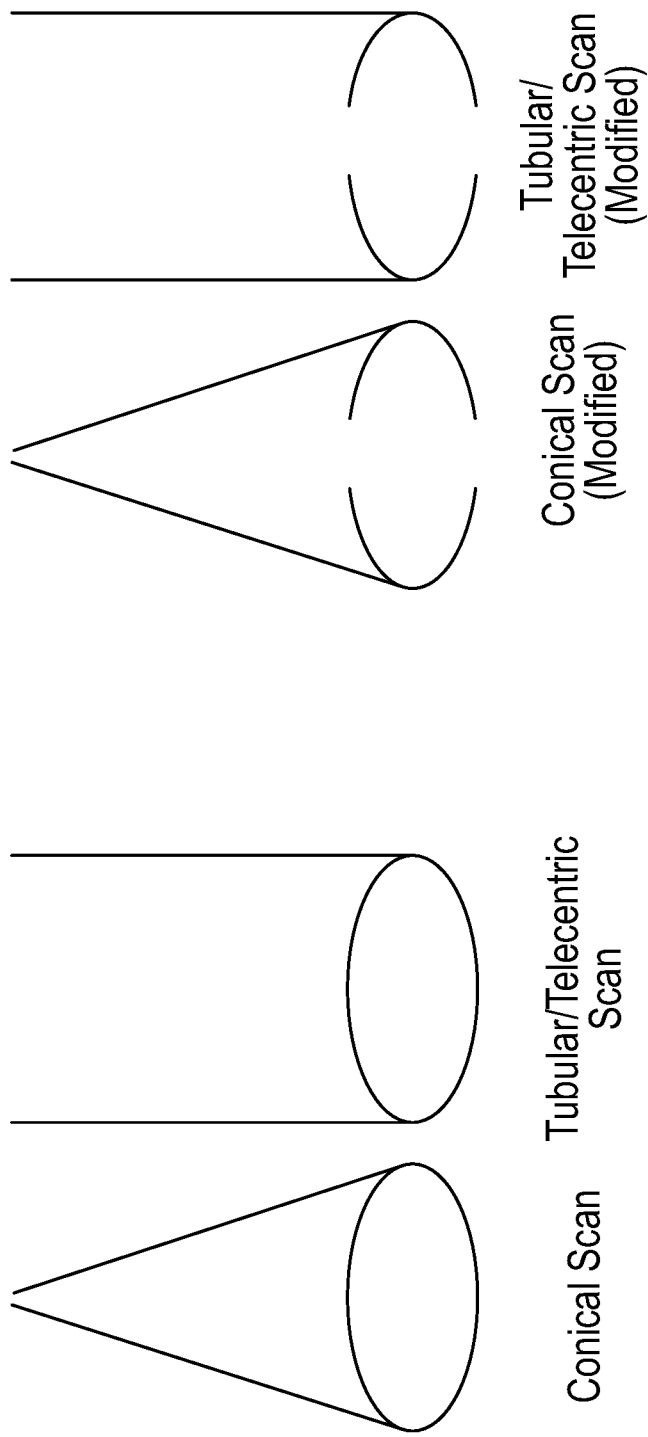
FIG. 18 illustrates example geometrical patterns of laser beams with complete geometrical patterns and geometrical patterns having portions blocked through use of a beam profiler.
Figure 19:
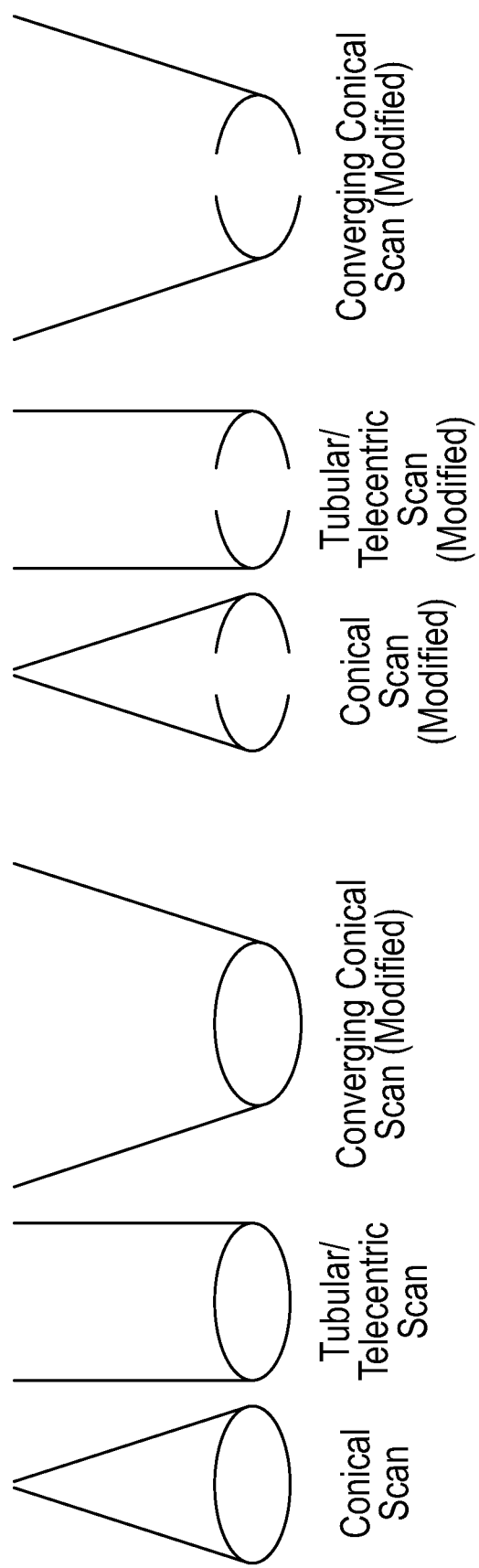
FIG. 19 illustrates example geometrical patterns of laser beams with complete geometrical patterns and geometrical patterns having portions blocked through use of a beam profiler.

FIG. 18 shows various embodiments of the present technology with the addition of a beam profiler/cropper that applies to any scan system that produces a circle or oval scan pattern. The scan path of the laser beam can be conical or tubular, as the light moves towards the target, to produce a circle. Such systems can include the use of optics such as f-theta lenses, telecentric lenses, and prisms. Various embodiments of the present disclosure also incorporate collimated beams and/or beams that diverge or converge as they travel through space. For example, this may apply to any type of circular scanning system. There are several ways to create a circle or oval with a laser. A circular scan pattern can be created using a galvo-mirror system, rotating mirrors, rotating prisms, and other methods/systems/components. In FIG. 19, embodiments of systems disclosed herein can be used to create any variation in beam shapes such as conical, tubular/telecentric, which are illustrated on the left hand side. The use of a beam profiler can create the modified scans on the right hand side of the diagram, which each include obscured portions.

Referring back to FIGS. 11-13, in operation, a contact area comprises a location on the target 1006 where the laser beam shaped by the beam profiler 1002 contacts the target 1006. The target 1006 is rotated by the lathe shaft 1010. As the target 1006 rotates, the laser beam is directed to the target 1006. The beam profiler 1002 obscures a portion of the laser beam and creates a modified scan pattern in a contact area on the target 1006. Obscuring portions of the laser beam reduces over exposure of the target 1006 to the laser beam. Again, this is caused in part by the cylindrical shape of the target 1006. Without the beam profiler portions of the laser beam contact the cylindrical target at the potions of cylindrical target 1006 which are closest in relation to the output 1028 of the laser sub-assembly 1004, resulting in over exposure of the target 1006 to the laser beam.

Figure 20:
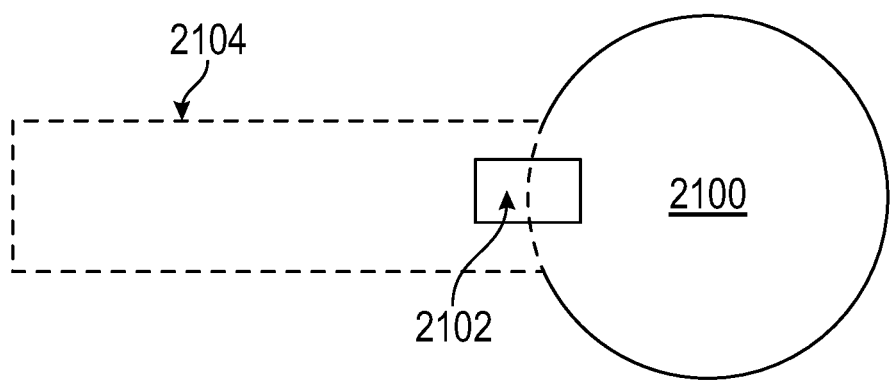
FIGS. 20 and 21 collectively illustrate a beam profiler used to correct potential laser beam over exposure.
Figure 21:
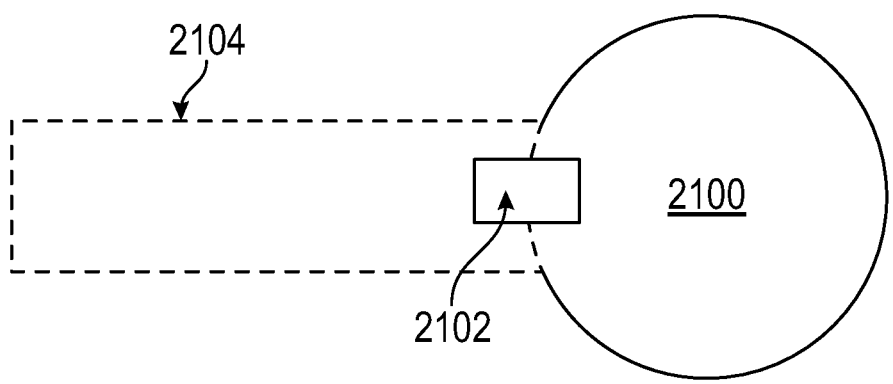

This relationship is illustrated in FIG. 20 where an obscured portion 2102 of a target 2100 that is nearest an output (such as a lens) of the laser beam 2104 would be over exposed to the laser beam 2104. FIG. 21 illustrates the laser beam 2104 after shaping with a beam profiler, where the obscured portion 2102 is not exposed to the laser beam 2104 in such a way that over exposure occurs. Naturally, rotation of the target 2100 will expose the target 2100 to portions of the laser beam 2104 in the contact areas above and below the obscured portion 2102.

In some embodiments, the lens can be incorporated into (or be equivalent to) the output of the laser sub-assembly.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A system comprising:
    a laser sub-assembly that emits a laser beam in a geometrical pattern along a path that extends from a housing of the laser sub-assembly to a target;
    a beam profiler that is disposed within the path so as to block a portion of the geometrical pattern of the laser beam from contacting the target; and
    a linkage sub-assembly that couples the beam profiler to the housing of the laser sub-assembly, the linkage sub-assembly comprising a first linkage that extends from the housing and a second linkage that is pivotally connected with the first linkage,
    wherein the beam profiler is directly coupled with the second linkage in such a way that pivoting of the second linkage changes a tilt angle of the beam profiler.

2. The system according to claim 1, wherein the laser sub-assembly comprises a laser source and a scanner that produces the geometrical pattern.

3. The system according to claim 2, wherein the geometrical pattern comprises any of elliptical, ovoid, conical, and frusto-conical.

4. The system according to claim 2, wherein the scanner comprises at least one of a lens, a galvo-mirror system, a rotating mirror, and a rotating prism.

5. The system according to claim 1, wherein the beam profiler comprises a flat member that is placed between an output of the laser sub-assembly and the target.

6. The system according to claim 1, wherein the beam profiler is configured to selectively translate relative to a terminal end of the second linkage using a fastener of the beam profiler that extends through a slot of the second linkage.

7. The system according to claim 1, wherein the linkage sub-assembly comprises a first linkage that extends from the housing, wherein the beam profiler is directly and pivotally coupled with the second linkage in such a way that the tilt angle of the beam profiler is selectively changed.

8. The system according to claim 7, wherein the beam profiler is configured to selectively translate relative to a terminal end of the second linkage along a slot in the first linkage.

9. The system according to claim 1, wherein the beam profiler is held in pivoting position such that the tilt angle of the beam profiler is selectively adjustable.

10. The system according to claim 9, wherein tilting of the beam profiler from a zero degree position blocks an additional amount of the geometrical pattern compared to the portion blocked when the beam profiler is in the zero degree position.

11. A system comprising:
    a laser sub-assembly that emits a laser beam in a geometrical pattern along a path that extends from an output of the laser sub-assembly to a cylindrical target;
    a beam profiler that is disposed within the path so as to block a portion of the geometrical pattern of the laser beam from contacting the cylindrical target, wherein a terminal end of the beam profiler comprises heat sink fins for dissipating heat retained by the beam profiler; and
    a linkage sub-assembly that couples the beam profiler to a housing of the laser sub-assembly, the linkage sub-assembly comprising a first linkage that extends from a housing of the laser sub-assembly and a second linkage that is pivotally connected with the first linkage, wherein the beam profiler is directly coupled with the second linkage in such a way that pivoting of the second linkage changes a tilt angle of the beam profiler.

12. The system according to claim 11, wherein the laser sub-assembly comprises a lens selected from any of a f-theta lenses, telecentric lenses, prisms, or any combinations thereof.

13. The system according to claim 11, further comprising a frame, the laser sub-assembly being disposed on the frame, the frame further rotatingly supporting a plurality of wheels that receive the target.

14. The system according to claim 11, wherein the beam profiler is configured to selectively translate relative to a terminal end of the second linkage using a slot of the second linkage and a fastener.

15. The system according to claim 11, wherein the beam profiler is directly and pivotally coupled with the first linkage in such a way that the tilt angle of the beam profiler is selectively changed so as to change an amount of a scan path that is cropped out.

16. The system according to claim 15, wherein the beam profiler is configured to selectively translate relative to a terminal end of the second linkage along a slot in the second linkage.

17. The system according to claim 11, wherein the laser sub-assembly comprises a laser source and a scanner that produces the geometrical pattern.

18. The system according to claim 17, wherein the geometrical pattern comprises any of elliptical, ovoid, conical, and frusto-conical.

19. The system according to claim 11, wherein the beam profiler comprises a flat member that is placed between an output of the laser sub-assembly and the cylindrical target.

20. The system according to claim 11, wherein the beam profiler is held in pivoting position such that the tilt angle of the beam profiler is selectively adjustable.

* * * * *

UNITED STATES PATENT AND TRADEMARK OFFICE
CERTIFICATE OF CORRECTION

PATENT NO. : 11,047,017 B2  
APPLICATION NO. : 15/953163  
DATED : June 29, 2021  
INVENTOR(S) : Bartosz Andrzej Dajnowski Page 1 of 1

It is certified that error appears in the above-identified patent and that said Letters Patent is hereby corrected as shown below:

On the Title Page

Under the item (*) Notice, the sentence reading:
"This patent is subject to a terminal disclaimer." should be deleted.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*